United States Patent
Morita et al.

(10) Patent No.: US 7,353,046 B2
(45) Date of Patent: Apr. 1, 2008

(54) PORTABLE TELEPHONE

(75) Inventors: Kugo Morita, Kanagawa-ken (JP); Donald R. Timms, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 70 days.

(21) Appl. No.: 10/862,479

(22) Filed: Jun. 7, 2004

(65) Prior Publication Data

US 2005/0037816 A1    Feb. 17, 2005

Related U.S. Application Data

(63) Continuation-in-part of application No. 09/569,270, filed on May 11, 2000, now Pat. No. 6,766,018.

(30) Foreign Application Priority Data

| May 12, 1999 | (JP) | ................................. 11-131015 |
| May 17, 1999 | (JP) | ................................. 11-136458 |
| Sep. 22, 1999 | (JP) | ................................. 11-268937 |
| Sep. 22, 1999 | (JP) | ................................. 11-268938 |

(51) Int. Cl.
  H04B 1/38   (2006.01)
  H04L 12/58  (2006.01)
  H04M 11/00  (2006.01)
  G09G 5/00   (2006.01)
  G06F 3/02   (2006.01)

(52) U.S. Cl. ................ 455/566; 455/412.1; 379/93.23; 345/156; 345/168

(58) Field of Classification Search ................ 455/566, 455/550.1, 412.1; 345/168, 169, 156; 379/93.23, 379/93.17, 142, 354; 348/14.03
See application file for complete search history.

(56) References Cited

U.S. PATENT DOCUMENTS

4,908,853 A * 3/1990 Matsumoto ............ 379/355.09

(Continued)

FOREIGN PATENT DOCUMENTS

JP            03214194 A  *  9/1991

OTHER PUBLICATIONS

Patent Abstract of Japan, Publication No. 03-214194.*

*Primary Examiner*—Lester G. Kincaid
*Assistant Examiner*—Marisol Figueroa
(74) *Attorney, Agent, or Firm*—Hogan & Hartson LLP

(57) ABSTRACT

A portable telephone has a phone-book capability of storing and searching plural pieces of receiver information including character information and image information and comprises phone-book memory means for registering plural pieces of receiver information including character information and image information associated with each other; decoding means for decoding the image information stored in the phone-book memory means; display means for displaying the character information and the image information stored in the phone-book memory means; operation means for outputting a select signal in accordance with an external operation; and control means for controlling the phone-book memory means, the decoding means, the display means, and the operation means. The control means performs such control that when a plurality of select signals for selecting different pieces of receiver information from that receiver information which is currently displayed on the display means are output from the operation means continuously or over a given period of time, those character information which are included in the selected pieces of receiver information are sequentially displayed on the display means in accordance with the select signals and only that image information which corresponds to a last select signal output is decoded by the decoding means and is displayed on the display means.

23 Claims, 20 Drawing Sheets

U.S. PATENT DOCUMENTS

| | | | | |
|---|---|---|---|---|
| 5,854,629 A | * | 12/1998 | Redpath | 345/341 |
| 5,889,852 A | * | 3/1999 | Rosecrans et al. | 379/355.05 |
| 5,923,327 A | * | 7/1999 | Smith et al. | 715/784 |
| 6,084,951 A | * | 7/2000 | Smith et al. | 379/93.17 |
| 6,301,471 B1 | * | 10/2001 | Dahm et al. | 455/405 |
| 6,381,513 B1 | * | 4/2002 | Takase et al. | 700/231 |
| 6,477,390 B1 | * | 11/2002 | Gum et al. | 455/550.1 |
| 2004/0204145 A1 | * | 10/2004 | Nagatomo | 455/566 |
| 2004/0207722 A1 | * | 10/2004 | Koyama et al. | 348/14.02 |

\* cited by examiner

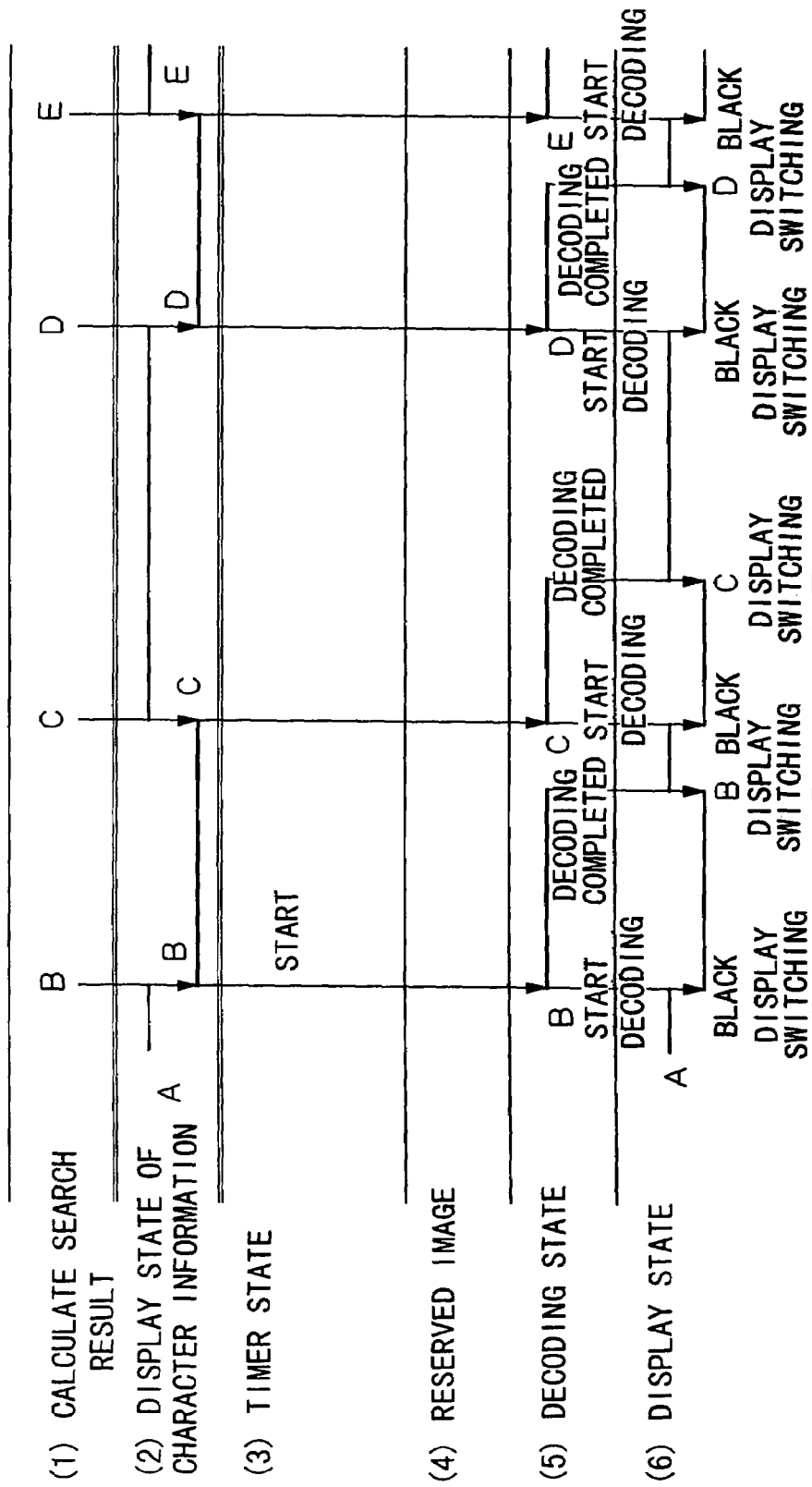

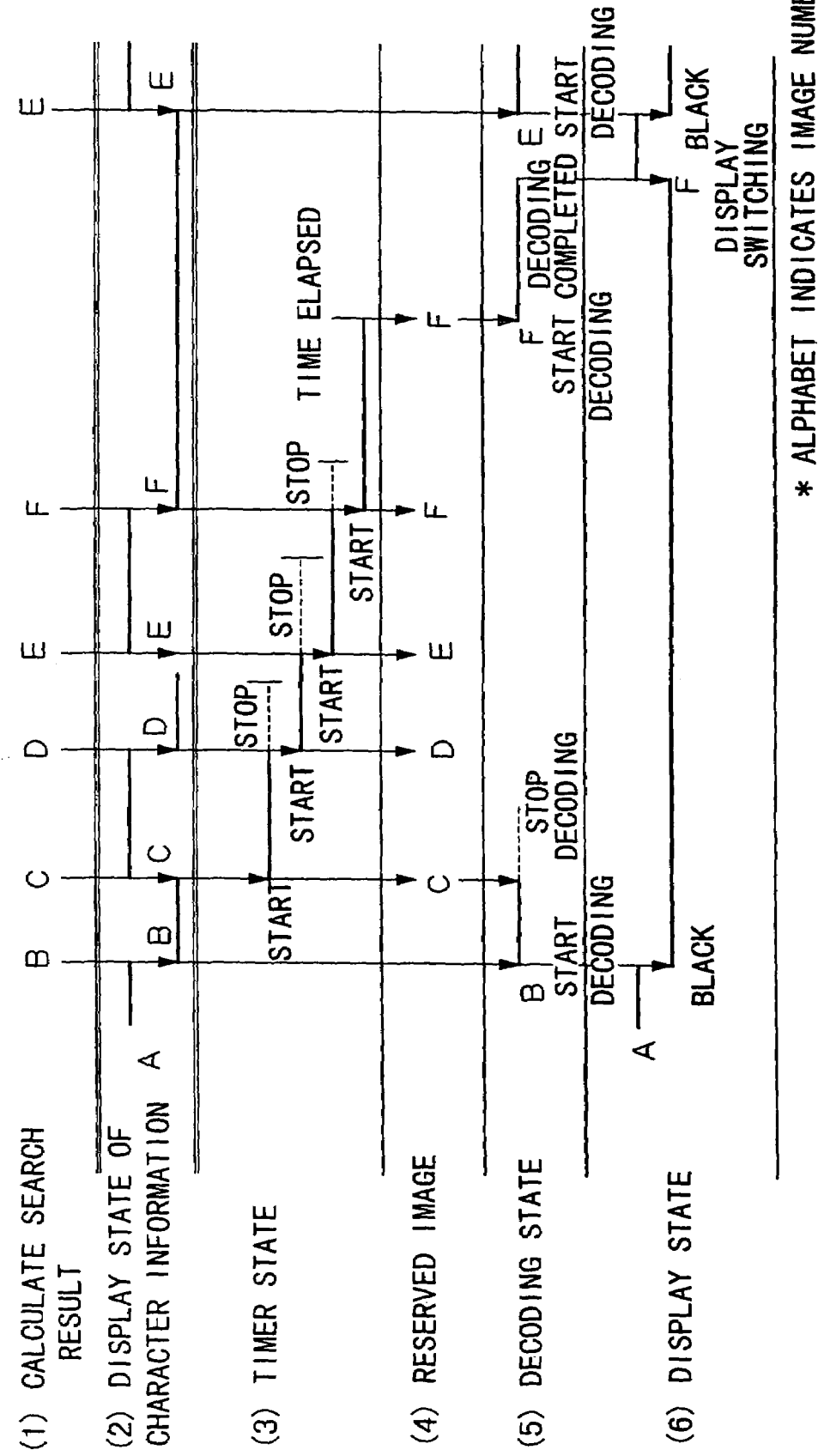

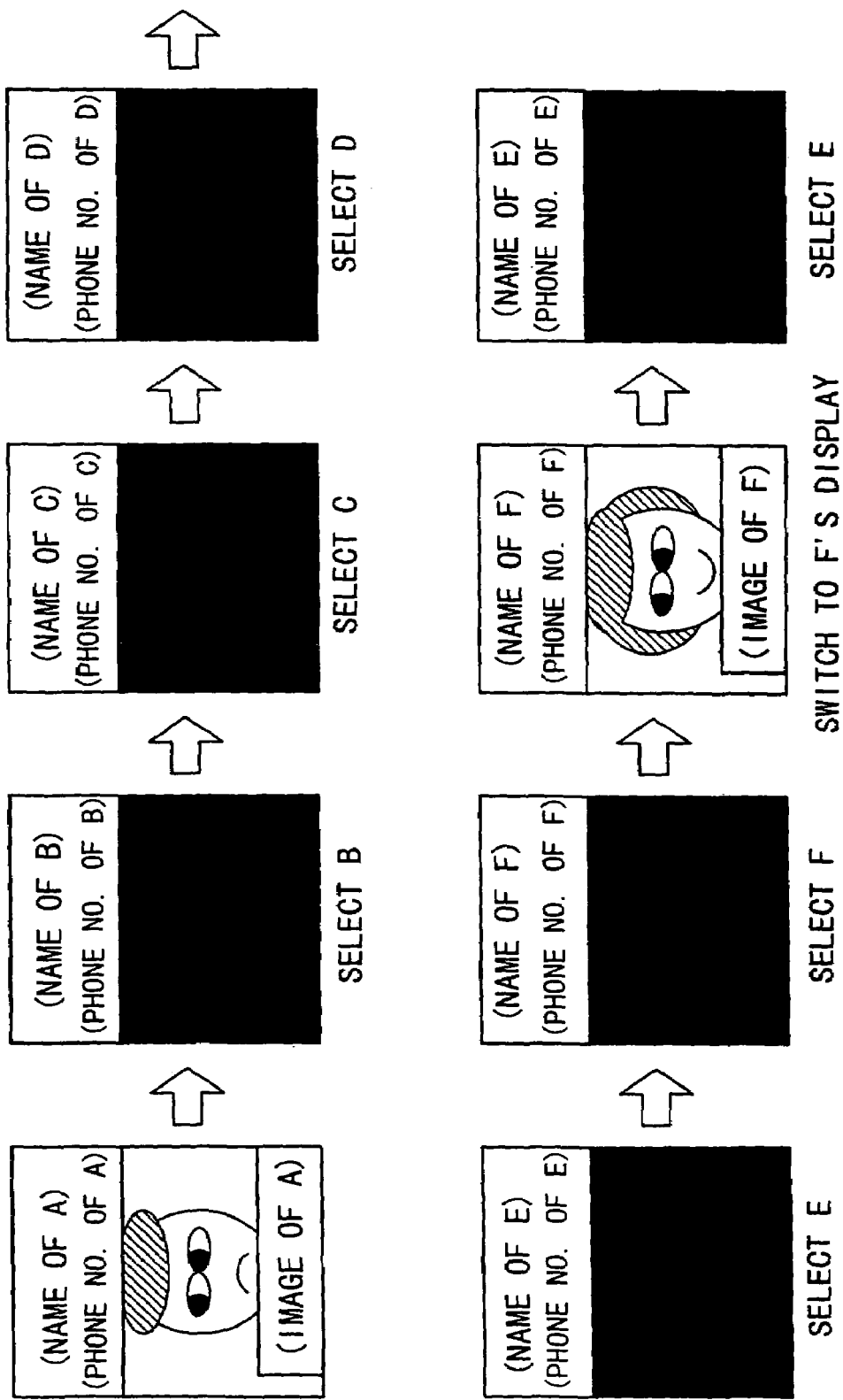

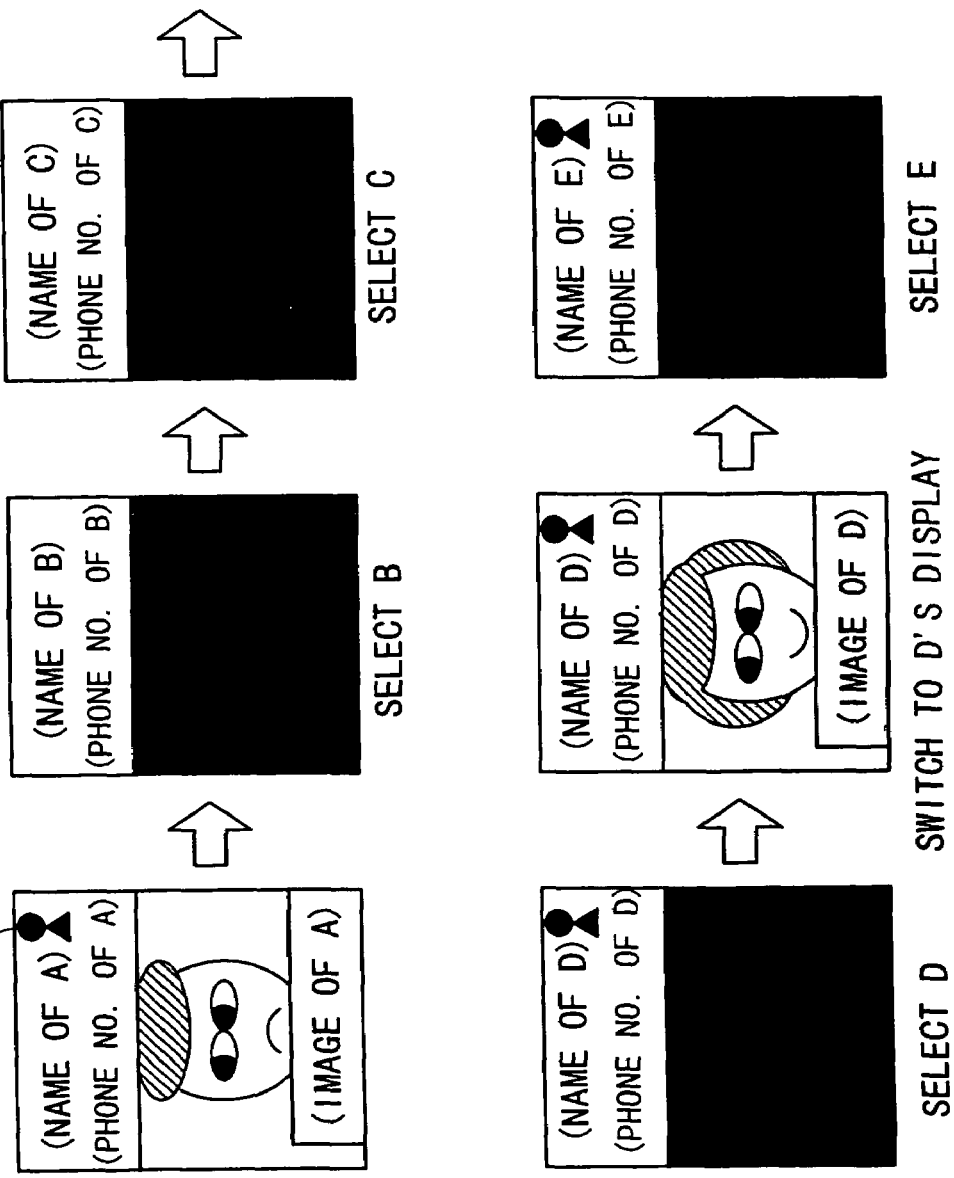

PORTABLE TELEPHONE

RELATED APPLICATIONS

This is a continuation-in-part of U.S. application Ser. No. 09/569,270, filed May 11, 2000, now U.S. Pat. No. 6,766,018 which claims the benefit of Japanese Application No. 11-131015, filed May 12, 1999, and of Japanese Application No. 11-136458, filed May 17, 1999, and of Japanese Application No. 11-268938, filed Sep. 22, 1999, and of Japanese Application No. 11-268937, filed Sep. 22, 1999, the disclosures of which are hereby incorporated by reference.

FIELD OF THE INVENTION

The present invention relates to a portable telephone having a phone-book capability of registering image information, and, more particularly, to a technique of searching information registered in a phone book and displaying the search result.

BACKGROUND OF THE INVENTION

Typical wireless communication devices, such as portable telephones, have a phone-book capability, which registers predetermined names, telephone numbers, and other personal information, and quickly reads a series of information as needed. This phone-book capability can allow a user to make a telephone call without searching another medium, such as a printed phone directory or an address book. When a call arrives, it is possible to compare the caller number informed by the caller with the data registered in the portable telephone and display the corresponding name so that the user can know who the caller is before answering the call.

Recently portable video telephones have been proposed which are capable of handling image information. This type of portable video telephone transmits or receives voices and images simultaneously, so that the caller and receiver can talk to each other while viewing the images sent from the opposite parties. Further, this portable video telephone can record an image received while talking or record an image that is taken by a camera incorporated into the video telephone.

Such a portable video telephone can also handle stored image information as information attached to the registered data in the phone book. At the time the phone book is searched for personal information, this capability can permit the user to conduct a search while viewing image information. When a call comes, this capability can display image information together with name information, helping the user understand immediately who the caller is.

There are several ways to retrieve necessary information using the phone-book capability. They include a scheme of allowing a caller to input information (a name or address) associated with a receiver and then retrieving necessary information based on the input information, and a scheme of retrieving necessary information while allowing a user to confirm registered data piece by piece. According to either scheme, when the displayed retrieval result is not the intended one, the intended data is searched by scrolling the displayed information up and down by operating, for example, scroll keys.

At this time, the phone-book capability of this portable video telephone displays attached image information in addition to character information, such as names and telephone numbers. As image information contains a large amount of data, the data quantity is reduced before storage by subjecting the image information to coding such as the one specified by JPEG (Joint Photographic Experts Group). This requires that image information be decoded before it is displayed. The time needed for decoding and displaying an image is longer than the time needed for displaying character information.

As image decoding involves a great deal of work, there is some time delay in displaying the next image. This prevents the user from proceeding to the next search or disables a spontaneous response to the next key operation during the period from the point of the previous search operation to the display of an associated image, thus resulting in a lower operability.

Further, there is a time lag from the display of character information to the display of an associated image. Unless some update control is carried out to maintain the association of character information and image information to be displayed, therefore, the image that has been generated by the immediately previous operation and character information resulting from the current search may be displayed simultaneously, resulting in the mismatching of characters and an image. When character information is displayed after being updated, therefore, it is necessary to erase the image that has been displayed before the update.

Conventionally, when registered data contained an image, a black screen or the like was displayed, as in the case where registered data would contain no image, until the image would be displayed after the display of character information. As the display screen was imageless, such as a black screen, for a while after the display of character information, the user could not determine whether an image corresponding to the displayed character information would be displayed or there was no image corresponding to this character information.

SUMMARY OF THE INVENTION

Accordingly, it is an object of the present invention to provide a portable telephone which overcomes the aforementioned shortcomings of the prior art and has an improved operability and faster response speed while conducting a continuous search.

To achieve the above object, according to the first aspect of this invention, there is provided a portable telephone having a phone-book capability of selecting and displaying receiver information (addressee information) having character information and image information registered therein in association with each other, wherein at the time different pieces of receiver information from currently-displayed receiver information are selected and displayed in order, those pieces of character information which are included in the selected pieces of receiver information are sequentially displayed in association with the selected pieces of receiver information and only that image information which corresponds to the last-selected receiver information is displayed.

As this portable telephone performs a display process only on the image information that corresponds to the receiver information which has been acquired last in a continuous search of receiver information including image information, it is possible to improve the operability and response speed at the time of conducting a continuous search.

In this case, at the time of selecting and displaying receiver information different from currently-displayed receiver information, image information which does not depend on receiver information may be displayed until that image information which is included in the selected receiver information is displayed.

Alternatively, at the time of selecting and displaying receiver information different from currently-displayed receiver information, a screen for displaying image information may be turned off or darkened until that image information which corresponds to the selected receiver information is displayed.

According to the second aspect of this invention, there is provided a portable telephone which comprises phone-book memory means for registering plural pieces of receiver information including character information and image information associated with each other; decoding means for decoding the image information stored in the phone-book memory means; display means for displaying the character information and the image information stored in the phone-book memory means; operation means for outputting a select signal in accordance with an external operation; and control means for controlling the phone-book memory means, the decoding means, the display means, and the operation means, and performing such control that when a plurality of select signals for selecting different pieces of receiver information from that receiver information which is currently displayed on the display means are output from the operation means continuously or over a given period of time, these character information which is included in the selected pieces of receiver information are sequentially displayed on the display means in accordance with the select signals and only that image information which corresponds to a last select signal output is decoded by the decoding means and is displayed on the display means.

In this case, when a plurality of select signals for selecting different pieces of receiver information from that receiver information which is currently displayed on the display means is output from the operation means, the control means may perform such control as to display image information which does not depend on receiver information on the display means until that image information which corresponds to a last select signal output from the operation means is decoded by the decoding means and is displayed on the display means.

In the portable telephone according to the second aspect of this invention, the display means may have an area for displaying character information and an area for displaying image information, and when a plurality of select signals for selecting different pieces of receiver information from that receiver information which is currently displayed on the display means are output from the operation means, the control means may perform such control as to turn off or darken the area of the display means for display image information until that image information which corresponds to a last select signal output from the operation means is decoded by the decoding means and is displayed on the display means.

In the portable telephone according to the second aspect of this invention, when image information in that receiver information which is currently displayed on the display means does not coincide with image information in that receiver information which corresponds to a select signal output from the operation means, the decoding means may decode the latter image information.

According to the third aspect of this invention, there is provided a portable telephone which has a phone-book capability of storing plural pieces of character information, such as names and telephone numbers, and image information associated with the character information and searching the storage contents, and comprises operation means for inputting an operation instruction for searching a phone book; measuring means for measuring an input interval between inputs made through the operation means; and control means for controlling a time for starting the decoding of image information in accordance with the input interval of the operation means.

As this portable telephone varies the delay time till the beginning of an image decoding process based on the key-signal input interval, it is possible to reduce the frequency of the process of stopping the image decoding process, thus reducing the load on the search process and ensuring a smoother operability.

According to the fourth aspect of this invention, there is provided a portable telephone which has a phone-book capability of storing plural pieces of character information, such as names and telephone numbers, and image information associated with the character information and searching the storage contents, and comprises operation means having an operation key or a plurality of buttons; image decoding means for performing a decoding process on the image information stored in a coded form; and control means for performing a general control of the portable telephone and starting the decoding process on that image information which corresponds to a current search result when detecting that the operation of the operation means is released (release signal) while the phone-book capability is used in a search.

With this structure, because the image decoding/displaying process is started based on the release signal from the operation means, it is possible to omit a process of decoding unnecessary images at the time of using the phone-book capability in a search and the process of stopping this decoding process, and to perform decoding only on the image information that corresponds to whatever information is selected by a user. This can stabilize the search speed and ensure a smoother operability.

This portable telephone of the fourth aspect may further comprise a timer for measuring a predetermined time, whereby when detecting that the operation of the operation means is released, the control means may perform such control as to start the decoding process on that image information which corresponds to the search result after the timer measures the predetermined time.

In this case, as image decoding is stopped until the predetermined time specified by the time since the outputting of the release signal, it is possible to spontaneously respond to a re-manipulation of the operation means for a search operation.

According to the fifth aspect of this invention, there is provided a portable telephone which comprises phone-book memory means for registering plural pieces of receiver information including character information and image information associated with each other; display means for displaying the character information and the image information stored in the phone-book memory means; operation means for outputting a select signal in accordance with an external operation; detection means for detecting if image information corresponding to that receiver information which has been selected by an operation of the operation means is registered; and control means for outputting a display to the effect that the image information corresponding to the selected receiver information is not registered to the display means when the detection means outputs information indicating that the image information corresponding to the selected receiver information is not registered.

According to this portable telephone, because the display of character information acquired as a result of a search is made to vary depending on whether or not an image is included in the registered data acquired as the search result, it is possible to determine if an image is included in the retrieved registered data. This allows the user to avoid waiting unnecessarily for an image to be displayed when no image is present in the retrieved registered data, thus improving the operability of the phone book in the portable telephone.

According to the sixth aspect of this invention, there is provided a portable telephone which comprises phone-book memory means for registering plural pieces of receiver information including character information and image information associated with each other; display means for displaying the character information and the image information; operation means for outputting a select signal in accordance with an external operation; detection means for detecting if image information corresponding to that receiver information which has been selected by an operation of the operation means is registered; display-information memory means for storing display information indicating that the image information corresponding to the selected receiver information is not registered and display information indicating that the image information corresponding to the selected receiver information is registered; and control means for selecting a display content to be output from the display-information memory means based on an output of the detection means and displaying the selected display content on the display means.

In this case, the control means may perform such control as to output the display information indicating that the image information corresponding to the selected receiver information is registered to the display means before the image information corresponding to the selected receiver information is output to the display means.

According to the portable telephone of the fifth aspect or sixth aspect of this invention, at least one of the display information indicating that the image information corresponding to the selected receiver information is not registered and the display information indicating that the image information corresponding to the selected receiver information is registered may be character information.

According to the portable telephone of the fifth aspect or sixth aspect of this invention, the phone-book memory means may be storing index information about how the receiver information and the image information are registered, and based on the index information, the detection means may detect if image information is registered in the receiver information selected by the operation of the operation means.

In this case, it is possible to easily detect whether a registered image is standing by for the display process after a search operation or there is no registered image available as a search result and the display process has been finished.

The present invention further relates to computer readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention

BRIEF DESCRIPTION OF THE DRAWINGS

FIGS. 5A and 5B are timing charts for a search of the phone book and for displaying an image;

FIG. 6 is a diagram showing a display example of a phone-book search;

FIGS. 18 and 19 are diagrams showing display examples of a phone-book search.

DETAILED DESCRIPTION OF THE PREFERRED EMBODIMENTS

Preferred embodiments of the present invention will now be described with reference to the accompanying drawings.

Figure 1:
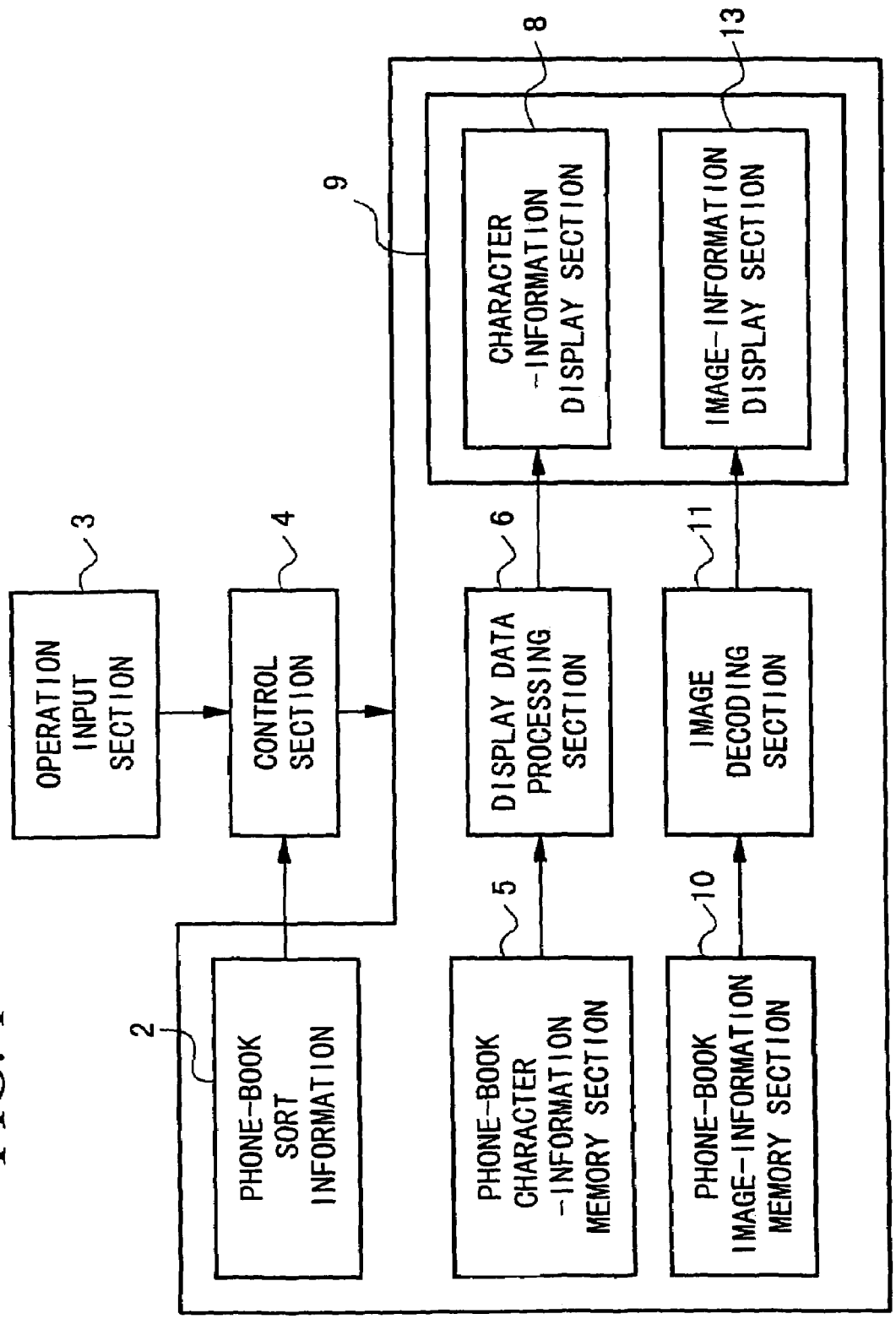
FIG. 1 is a block diagram illustrating a portable telephone according to a first embodiment of this invention.

FIG. 1 is a block diagram illustrating a portable telephone (portable video telephone) according to a first embodiment of this invention. This telephone has an operation input section 3 having keys, buttons, dials and so forth which a user can operate, and a control section 4. In response to a search request signal from the operation input section 3, the control section 4 searches the registered data based on phone-book sort information 2.

Based on data of the search result, the control section 4 reads information corresponding to the search result data from a phone-book character-information memory section 5 and a phone-book image-information memory section 10 and displays the information on a display section 9. The display section 9, which is constructed by a display device such as a liquid crystal display, comprises a character-information display section 8 and an image-information display section 13. Character information read from the phone-book character-information memory section 5 is processed so as to have a display format which is determined by a display data processing section 6 and is then displayed on the character-information display section 8. Image information read from the phone-book image-information memory section 10 is decoded by an image decoding section 11 and is then displayed on the image-information display section 13.

Figure 2:
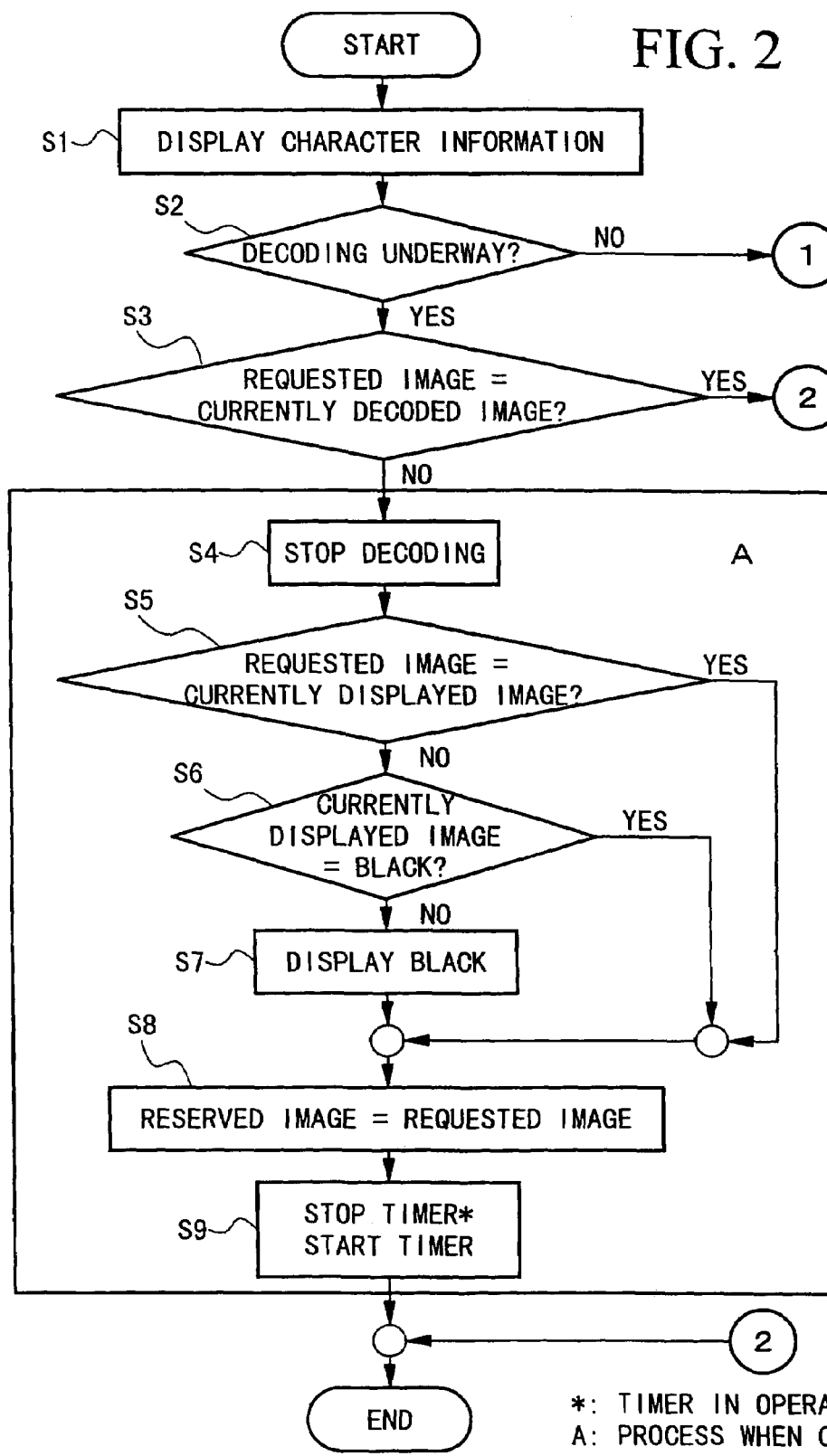
FIGS. 2 and 3 are flowcharts illustrating a routine which is carried out at the time of searching a phone book.
Figure 3:
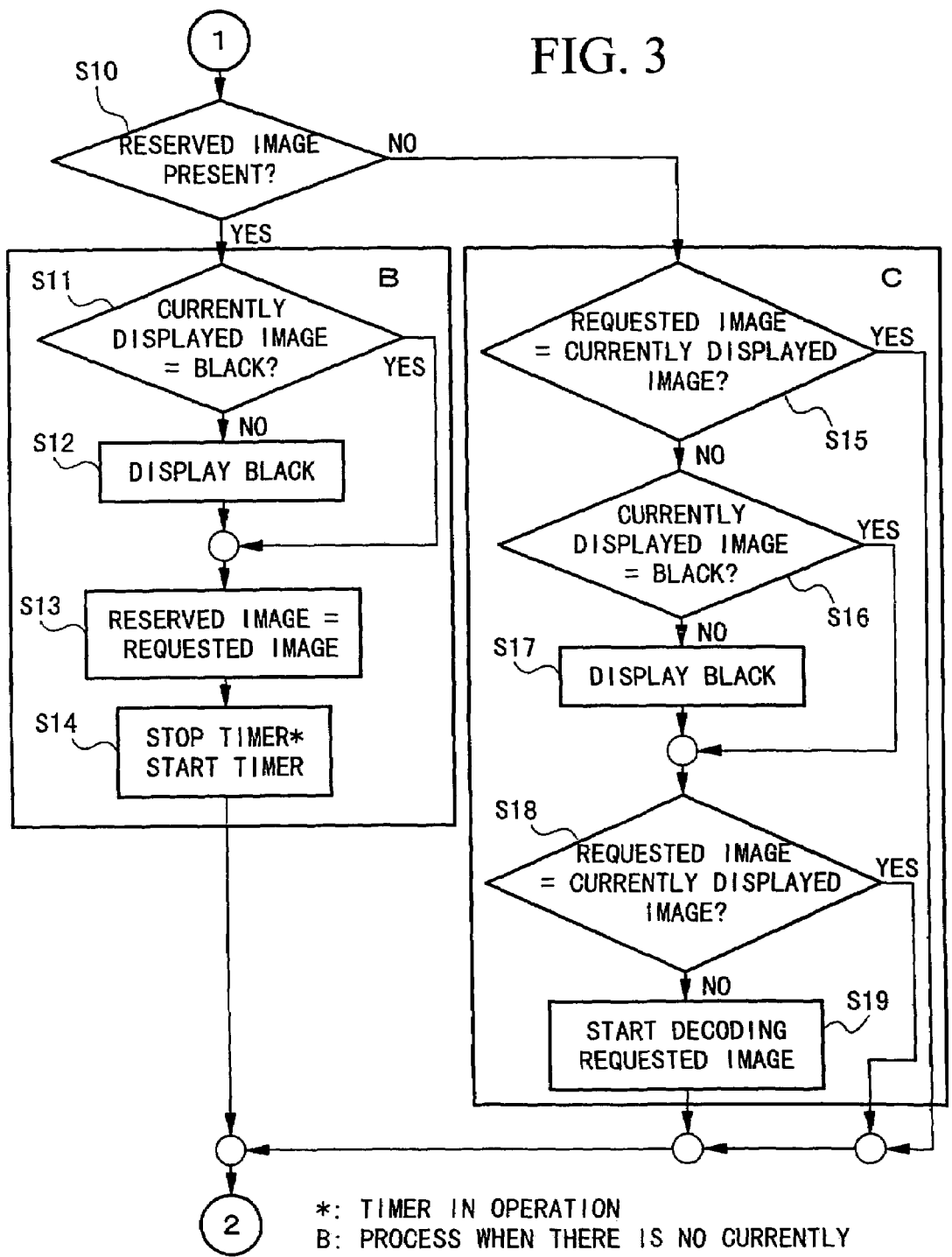
Figure 4:
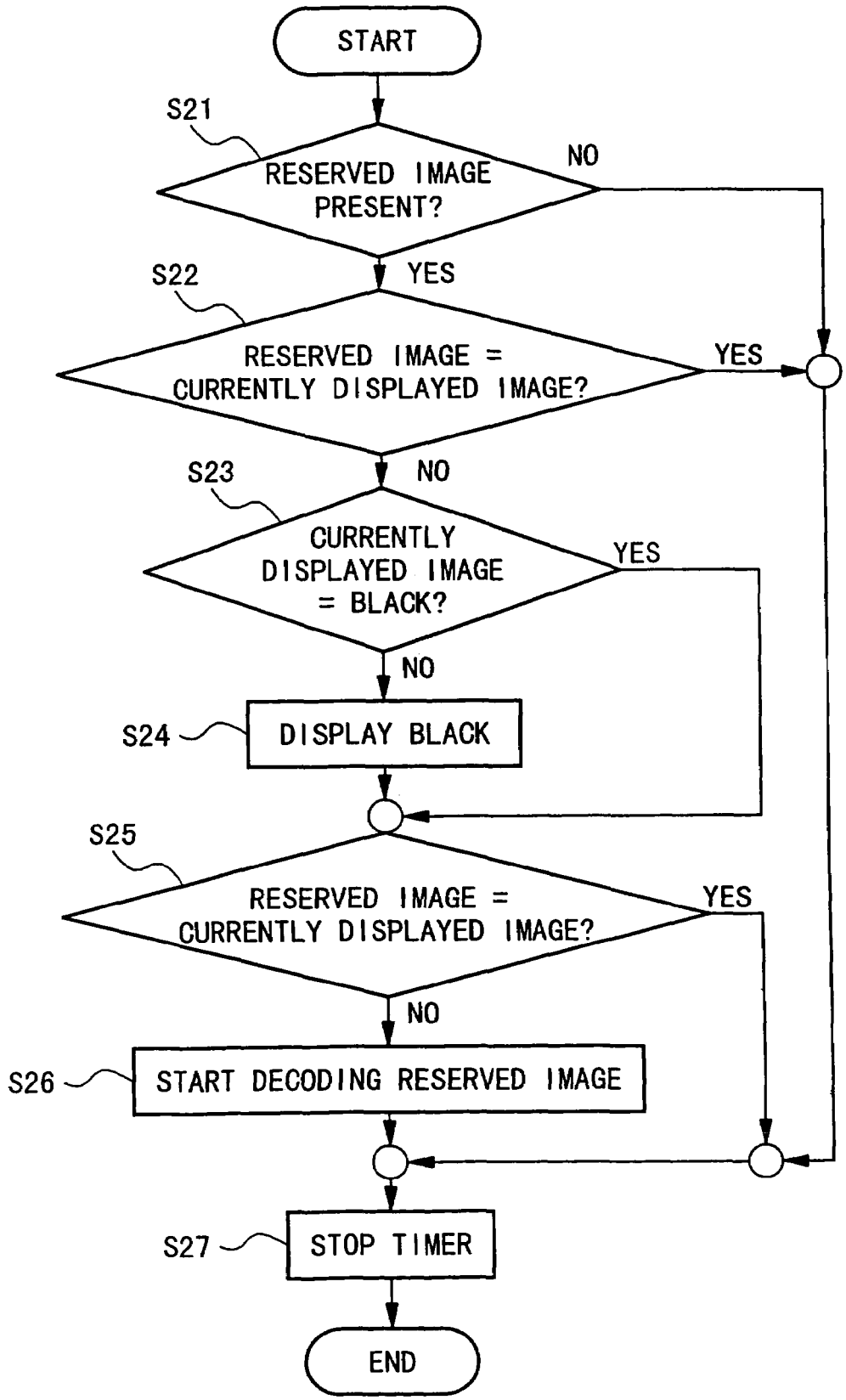
FIG. 4 is a flowchart illustrating a routine from the point when a reserved image has been determined to the point when the image is displayed on the screen.

FIGS. 2 and 3 are flowcharts illustrating the display process of this portable telephone which is carried out at the time of searching a phone book. In FIGS. 2 and 3, "currently-displayed image" means an image which is currently displayed, and "currently-decoded image" means an image which is currently decoded. Further, "reserved image" means an image which will be subjected to a display process, such as decoding and displaying, after a given time measured by a timer or the like. Furthermore, "black image" includes a display screen which indicates that the image of a search result is not displayed, an all-black display screen, a state in which only a given image is displayed, a state in which the backlight is darkened or turned off, and a state in which the display section 9 is powered off. A process which is carried out when the time set in a timer elapses is illustrated in FIG. 4.

The term image as used herein is intended to encompass all formats in which graphical data may be stored and conveyed. An image may comprise, without limitation, image data stored as a single or static image, image data stored as multiple, sequential images; and image data involving motion or video clips. The image data may be structured and stored in accordance with any appropriate graphic file format. Static images may be stored as, for example, a JPEG (joint photographic experts group) file, a GIF (graphic interchange format) file, a TIFF (tagged image file format) file, or as any other appropriate file format. Video clips may be stored as, for example, an MPEG (motion picture experts group) file, an animated GIF file, an AVI (audio/video interleaved) file, or as any other appropriate file format.

The present invention also embraces types of data other than image data that are stored and structured in decoding intensive formats. In addition to images, for example, distinctive audio files or sound bytes may be associated with contacts stored in the portable phone and played when calls or messages arrive, or as the user searches his contact information.

While the present invention is described primarily with reference to data stored in the phone book of a portable phone, its principles may be applied to any data repository structure. For example, image (static or video) or sound files for a user's contacts may also be associated with messages from those contacts in the messaging in-box portion of the phone. Hence, when a message arrives from an individual for whom image and/or sound files are stored, that image or sound file may be shown or played. Moreover, message attachments, such as images (static or video) and sound files, may be associated with messages in the messaging in-box. In this case, the presentation of such attachments may be carried out according to the techniques disclosed herein.

When the control section 4 acquires search result data as a consequence of a search operation performed by an operator or user, first, character information is displayed on the character-information display section 8. Thereafter, situation-dependent image processing is executed.

The broken-line block A in FIG. 2 indicates a process for the case where there is a "currently-decoded image". In FIG. 3, the broken-line block B indicates a process for the case where there is no "currently-decoded image" but there is a "reserved image", and the broken-line block C indicates a process for the case where there is neither a "currently-decoded image" nor a "reserved image".

When the user inputs a search request through the operation input section 3, first, character information is displayed (S1) and it is then determined if there is a currently-decoded image (S2).

When there is a currently-decoded image in step S2, it is determined if this currently-decoded image is the requested image (S3). When the decision result is negative (NO), this decoding is stopped (S4). Then, it is determined if the currently-displayed image is the requested image (S5). When the decision result is negative, the screen is made black (S6 and S7). Then, the requested image is registered as an image (reserved image) whose decoding should start after a given time (S8) and the timer is activated (S9). After the given time set in the timer passes, the requested image is displayed on the image-information display section 13.

When there is no currently-decoded image in step S2, it is determined in step S10 in FIG. 3 whether or not there is a reserved image whose decoding should start after the given time.

When there is such a reserved image, it is determined if the display screen is currently black (S11). When the display screen is not black, the screen is made black (S12) and the previously registered reserved image is deleted. Then, the requested image that is acquired through the search is registered as a reserved image (S13) and the timer which is operating is stopped and is activated again (S14). After the given time set in the timer elapses, the requested image is displayed on the image-information display section 13.

When it is determined in step S10 that there is no reserved image, it is then determined if the image of the search result (requested image) differs from a currently-displayed image (S15). When those images differ from each other, the screen of the image-information display section 13 is made black (S16 and S17). Then, it is determined again if the image of the search result (requested image) differs from a currently-displayed image (S18). When those images differ from each other, decoding the requested image is initiated (S19). When there is no search request made through the operation input section 3 until the decoding is completed, the decoded image is displayed on the image-information display section 13. When there is a match in the decision in step S18, there is no corresponding image information registered in the phone book so that the image-information display section 13 is kept black.

FIG. 4 is a flowchart illustrating a routine from the point when a reserved image has been determined to the point when the image is displayed on the screen. When the predetermined time set in the timer passes in step S14, it is determined if there is a reserved image (S21). When the decision result is affirmative (YES), it is checked if the reserved image differs from the currently-displayed image (S22). When both images differ from each other, the screen is made black (S23 and S24). An image may not be attached to the information that is to be displayed. In consideration of this case, therefore, it is checked again if the reserved image (which is black if no image is attached to the information) differs from the currently-displayed image (S25). When both images differ from each other, decoding the reserved image is started (S26). If no reserved image is present in step S21, if the reserved image matches with the currently-displayed image in step S22, or if both images are black in step S25, the timer is stopped (S27) and the routine is terminated.

FIGS. 5A and 5B illustrate timing charts for a search of the phone book and for displaying an image. The diagrams show, from the top, (1) the timing at which the search result is selected in accordance with a search operation, (2) the state where character information is displayed, (3) the activated, operating, and stopped, states of the timer, (4) the state where an image, which is subjected to a display process (decoding process) when the time set in the timer passes, is registered, (5) the started, progressing, stopped and terminated states of the decoding process, and (6) the state in which image information is displayed. The downward arrows in those figures indicate mutually linked processes.

Of the left-to-right lines, each thick line indicates a process in progress while each broken line indicates the remaining part of the process that has been stopped halfway. The capital letters identify registered data of the search result and the same capital letter indicates the same registered data. The word "black" represents an image display or a screen state (black screen) which is not related to the registered data of the search result.

FIG. 5A shows the case where a search request is input with a sufficient time interval after the previous image display has been completed. When a search request for phone-book data B is input, for example, decoding is started immediately and the phone-book data B is displayed upon completion of the decoding process. When the next search request (for phone-book data C) is subsequently received, decoding and displaying processes are similarly executed.

FIG. 5B shows the case where a series of search requests are input without a sufficient time interval therebetween. When a new search request for phone-book data C is input while the phone-book data B request first is being decoded, the decoding of the previous phone-book data B is stopped, the newly selected phone-book data C is registered as a reserved image whose decoding should be started after a given time and the timer is then activated. When a new search request for phone-book data D is input while this phone-book data C is being decoded, the decoding of the phone-book data C is stopped, the phone-book data D is newly registered as a reserved image and the timer is reactivated. When search requests for phone-book data E and phone-book data F have been made thereafter and when there is no new search request made until the time set in the timer passes after the registration of the last reserved image (F), decoding of the last reserved image (phone-book data F) is initiated and is displayed upon completion of the decoding process.

The above scheme reduces the decoding-oriented burden on the portable telephone and can thus prevent an input operation for a search from being temporarily disabled or the display associated with the input operation from being delayed. This can ensure a smooth continuous search of the phone book.

FIG. 6 exemplifies the displayed screens at the time a continuous search in FIG. 5B is conducted. The upper portion of each screen shows the name and telephone number as the search result and the lower part shows the image of the search result.

While a continuous search is conducted (from the selection of B to the selection of F in FIG. 5B), the process of displaying an image is not carried out so that the image-information display section 13 shows the screen (black image) that is not related to the search result. This provides this portable telephone with the same operability and response characteristic as those of a portable telephone which is not equipped with the image-information display section 13. When the continuous search is stopped, the image that has been finally retrieved is displayed.

Second Embodiment

The second embodiment of this invention will now be described. The second embodiment can overcome the following problem. According to the structure that activates the timer upon operation of the individual keys and starts decoding image information after a given time set in the timer in a continuous search as done in the first embodiment, when the following key operation is done during decoding, it is necessary to perform a process of stopping the decoding process in parallel to the execution of a process of displaying the screen which is associated with this key operation. This puts a burden on the control section and thus lowers the operability.

Figure 9:
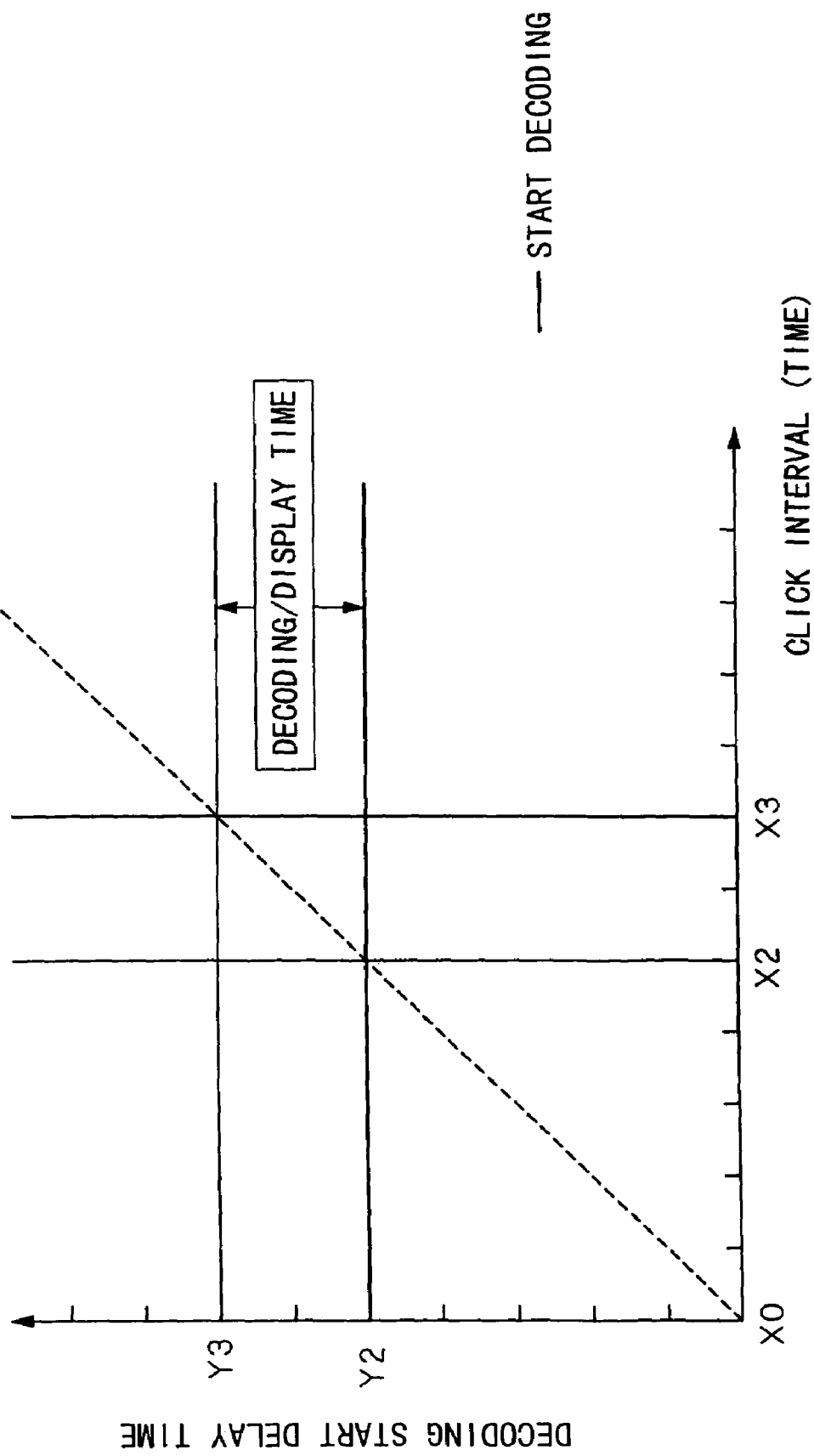
FIG. 9 is a graph depicting a problem to be solved by this embodiment.

This point will now be discussed with reference to FIG. 9. The vertical scale in the figure represents the delay time (timer activation time) from the input of a key signal to the initiation of decoding of image information based on the key-signal oriented search result, and the horizontal scale represents the interval of key operations (click interval). A thick line Y2 indicates the set delay time up to the beginning of decoding of an image, and a line Y3 indicates the time from the point when the time set in the timer has elapsed from the key operation to the point when the associated screen is displayed. Therefore, the time Y3 minus the time Y2 represents the time needed for image decoding and screen displaying. X2 shows the click interval equivalent to the delay time (Y2) up to the start of the decoding process and X3 shows the click interval equivalent to the time (Y3) from the point of the key operation to the point of displaying the screen.

When the click interval (X) is shorter than X2 ($X0 \leq X < X2$), there is a key-signal input before decoding starts. In this case, the decoding/displaying process is not started and only a process associated with the next key-signal input is carried out.

When the click interval (X) is longer than X3 (X>X3), a key signal is input after image decoding and screen displaying have been completed. In this case too, only a process associated with the next key-signal input is carried out.

When the click interval (X) is longer than X2 but shorter than X3 ($X2 \leq X \leq X3$), there is a next key-signal input during image decoding and screen displaying. This requires image decoding and screen displaying be stopped when a key signal is input. If the timing for continuously inputting key signals occurs frequently between X2 and X3, the control section is burdened with the process of stopping the image decoding/displaying process every time a key signal is input. This impairs the operability in a search and the search-oriented displaying process. The second embodiment of this invention is designed to resolve this shortcoming.

Figure 7:
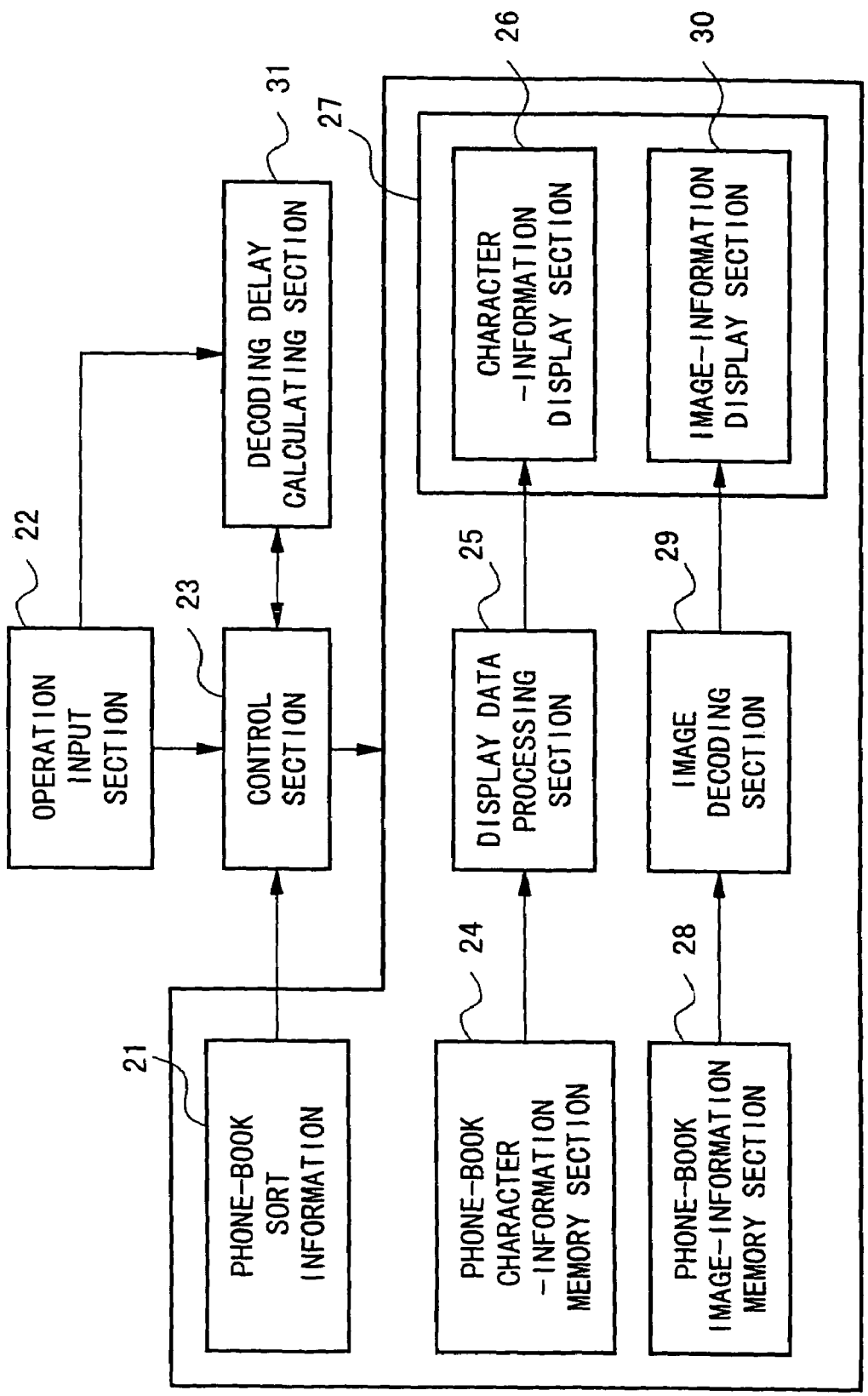
FIG. 7 is a block diagram illustrating a portable telephone according to a second embodiment of this invention.

As shown in FIG. 7, the portable telephone according to this embodiment comprises a phone-book sort information section 21, an operation input section 22, a control section 23, a phone-book character-information memory 24, a display data processing section 25, a display section 27, a phone-book image-information memory section 28, an image decoding section 29 and a decoding delay calculating section 31. The display section 27 has a character-information display section 26 and an image-information display section 30.

In response to a search request from the operation input section 22, the control section 23 searches registered data to read the desired character information from the phone-book character-information memory 24, processes the character information in the display data processing section 25, and displays the processed information on the character-information display section 26 of the display section 27.

When there is image information associated with the search result, the control section 23 starts a delay timer that determines the timing of starting the decoding of an image. When the time set in the delay timer elapses, the control section 23 reads image information from the phone-book image-information memory section 28, causes the image decoding section 29 to perform the decoding process on the image information, and displays the resultant information on the image-information display section 30. At this time, the decoding delay calculating section 31 calculates the delay time to the beginning of the image decoding/displaying process based on the input interval of operation signals from the operation input section 22 and the control section 23 sets a delay time in the timer based on the calculated delay time.

Figure 8:
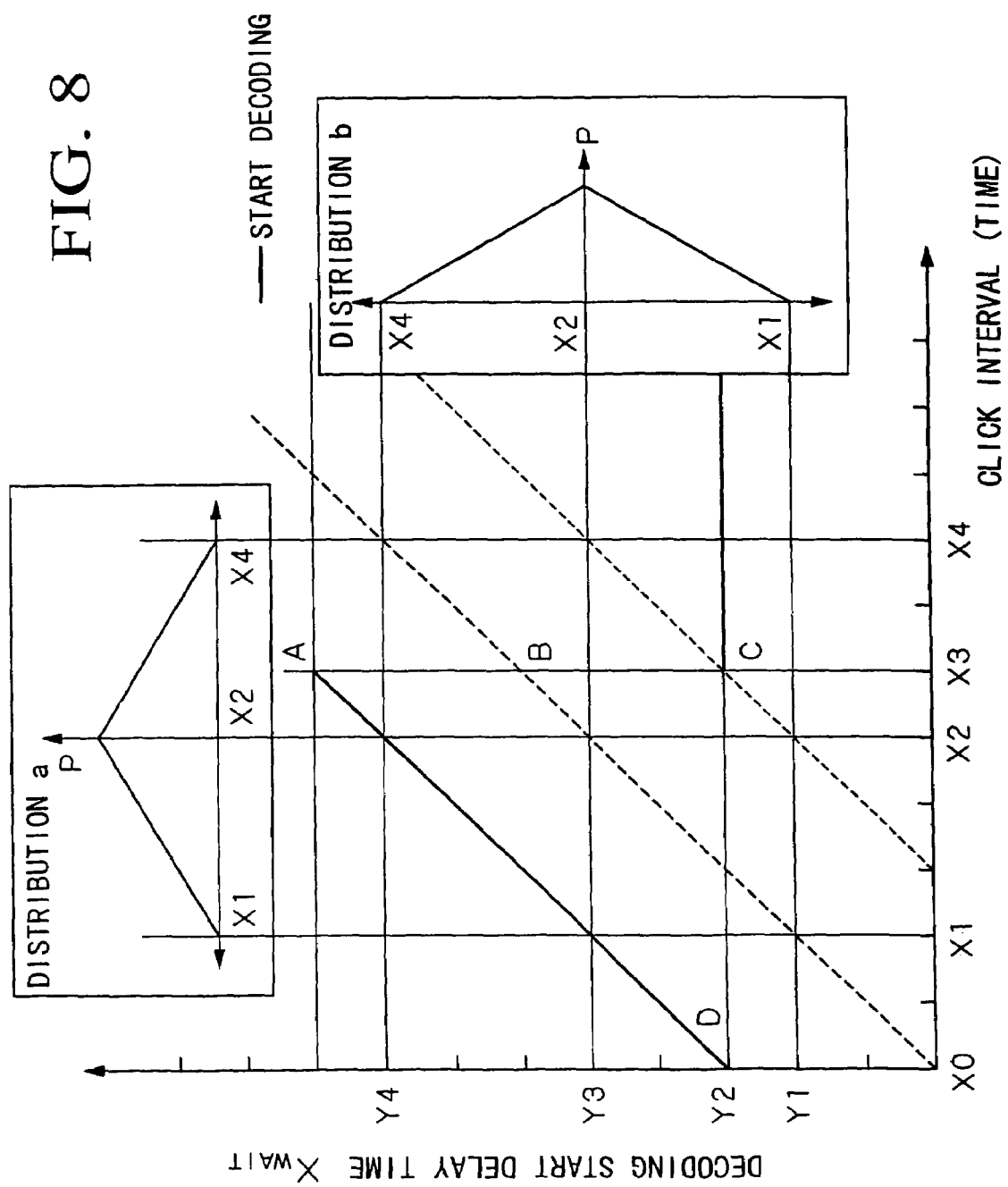
FIG. 8 is a graph showing the relationship between a key-signal input interval and a delay time for the initiation of decoding.

FIG. 8 is a graph showing the relationship between a key-signal input interval and a delay time to the initiation of decoding that is determined by the control section 23.

The vertical scale in FIG. 8 represents the delay time (time set in the timer) from the input of a key signal to the initiation of image decoding, and the horizontal scale represents the time interval of key signal inputs (click interval). The thick lines in the graph indicate the delay time to the start of image decoding.

In general, when a user uses the phone-book capability or the like to check (search) plural pieces of registered data by scrolling the screen or continuous display selection, the user often sequentially makes key inputs (to scroll the screen or instruct a display selection) at nearly constant intervals that vary from one user to another until the user finds the target registered data. Given that the value of the most frequent key-input interval in such a case is X2, the probability of the key-input time interval during searching has a peak at X2 and becomes lower toward the minimum value X1 and maximum value X4 as indicated by a distribution graph a in FIG. 8 (which is a schematic diagram).

Given that the delay time (timer activation time) on the vertical scale corresponding to the most frequent value X2 is Y3 and the delay times respectively corresponding to the minimum value X1 and maximum value X4 are Y1 and Y4, the key-input time interval can be expressed by a distribution graph b in FIG. 8.

If a key signal is input at an interval of X2, it becomes necessary to stop image decoding at the time of the next key input unless a decoding start delay time $X_{WAIT}$ is made longer than Y3. Because key inputs may not necessarily be made at an interval of X2, a given delay time (Y2) is added to the decoding start delay time $X_{WAIT}$.

In an exceptional case where the key-input time interval during searching is long, the minimum interval to permit sufficient image decoding until the next key input is X3. In this case, while it is essentially desirable to initiate image decoding right after a key signal is input, a given delay time (Y2) is provided in order to enhance the operability when a next key signal is input suddenly.

That is, this embodiment controls the decoding start delay time $X_{WAIT}$ as follows.

$$X_{WAIT}=X+Y2(X\leq X3) \quad (1)$$

$$X_{WAIT}=Y2(X>X3) \quad (2)$$

When the decoding start delay time $X_{WAIT}$ is controlled this way, the decoding start delay time $X_{WAIT}$ for a key signal input at the click interval X2 that has the highest probability becomes X2+Y2 and image decoding is not performed when the next key-input interval is less than X2+Y2. When the key-input interval is less than X2+Y2, therefore, a spontaneous response to the key input is possible. When the key-input interval becomes equal to or greater than X2+Y2, it can be considered that the search has been established and the associated image will be displayed.

If the click interval is as quick as X1, the decoding start delay time $X_{WAIT}$ becomes X1+Y2, so that the time until the beginning of image decoding and the time until the display of an image is decreased by X2−X1 compared to the case where the click interval is X2. That is, when the click interval is short, the display of image information becomes correspondingly quicker.

When the key-input time interval during searching is very long (equal to or greater than X3) so that image decoding can be carried out sufficiently by the next key input, the decoding start delay time $X_{WAIT}$ is set to a constant value of Y2. In this case, only when the next key input is made within an interval less than Y2, a spontaneous response is made to the key input, but images are displayed one at a time otherwise. The latter case is based on the assumption that the user makes a search while checking images one by one.

As is apparent from the above, the portable telephone of this embodiment has the following advantage. In a case of a fast and continuous search, the delay time up to the beginning of image decoding is made longer in proportion to the click interval, so that the probability of stopping image decoding becomes lower. In a case where a slow search is made, the delay time up to the beginning of image decoding is made shorter than the search interval to allow image decoding/displaying to be finished before a next key input is made. This also makes the probability of stopping image decoding lower.

The feature of this embodiment can prevent image displaying from being delayed more than needed and can thus improve the operability in a search operation.

Third Embodiment

The third embodiment of this invention will now be discussed. The third embodiment can overcome the following problem.

With the use of a portable telephone having a capability of scrolling phone-book data, a user can consecutively scroll phone-book data by depressing the operation key longer than the normal time and stop scrolling by releasing the operation key the instant the target data is displayed. Therefore, the CPU determines that the scroll-involved display is intended when a given time passes since the first depression of the operation key and determines that scrolling should be stopped when the operation key is released.

Conventionally, image decoding would start immediately upon the first depression of the operation key. If a given time until the scroll-involved display starts is shorter than the decoding time, therefore, it is necessary to execute a process of stopping image decoding or the like when the display mode is switched to the scrolling display mode. As this decoding stopping process overlaps the scrolling display control, there occurs an undesirable slight delay in the display of character information immediately after the mode change to the scrolling display mode.

Figure 14:
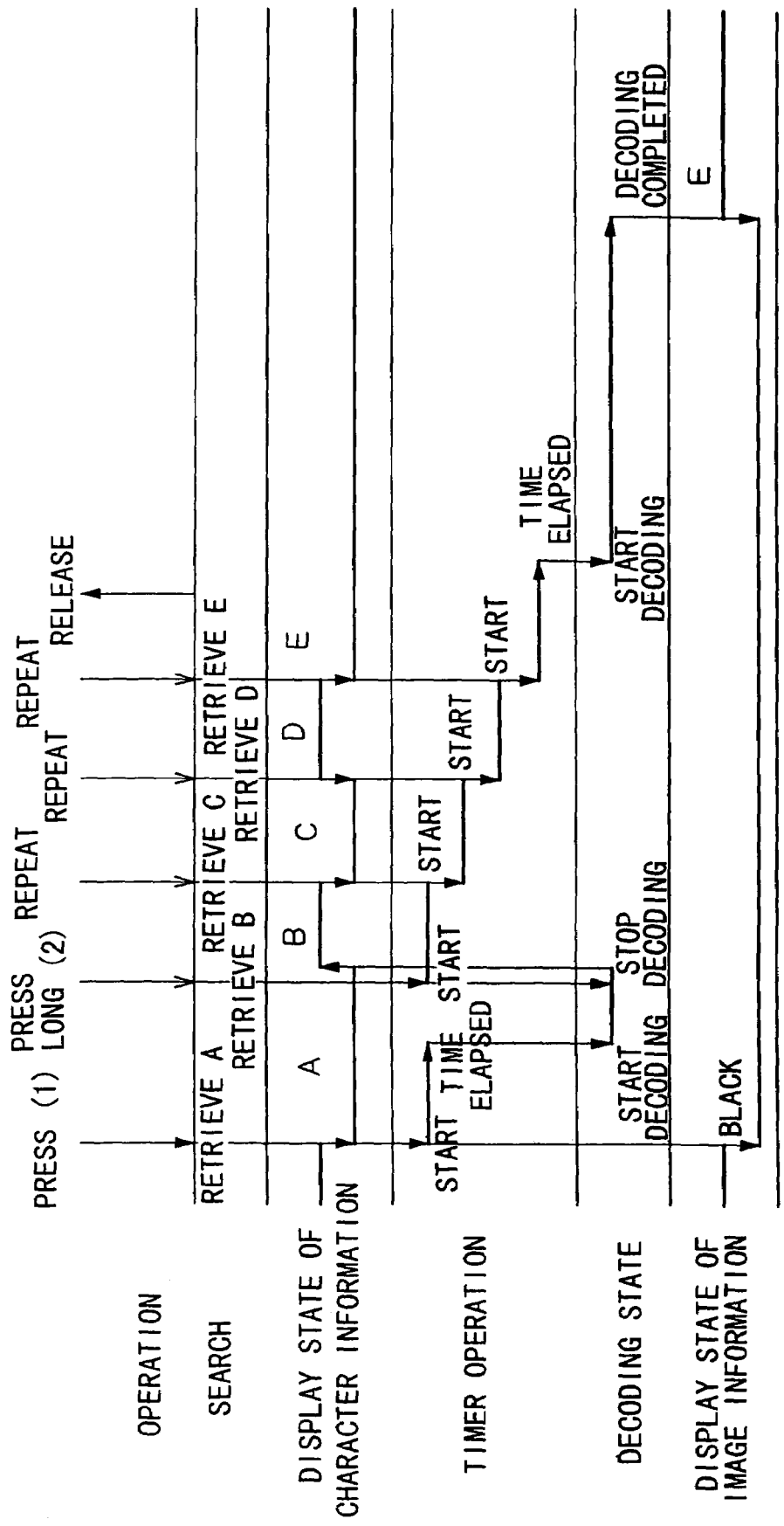
FIG. 14 is a timing chart for explaining the operation of a conventional portable telephone while searching a phone book.

This shortcoming will now be discussed specifically referring to FIG. 14, which illustrates a process in the case where image decoding starts after a given time elapses from the input of a key-depression signal (including a long-depression signal and a repeat signal). In response to the first depression (1), character information corresponding to a search A is displayed and at the same time the timer is activated. Upon passing of the delay time set in the timer, image decoding starts. When the key is kept depressed, however, the CPU outputs a long-depression signal (2) to demand the halting of the image decoding. Therefore, the burden of stopping image decoding results in slight delay in displaying character information corresponding to a search B. When the key is kept depressed thereafter, a repeat signal to display the next information is input and the deactivation and activation of the timer are performed every time the signal input is made. Consequently, the display time for character information associated with the search B immediately after the mode change to the scroll-involved search mode becomes shorter than that for character information associated with the subsequent searches C and D.

One solution to such a shortcoming is to display character information associated with the search B prior to the process of stopping image decoding. This scheme does not however overcome the shortcoming in the case where the depression of the operation section is released after the long-depression signal (2) has been output (after the scroll-involved display has been started) and the operation section is quickly depressed again. In this case, because the process of halting image decoding has been performed prior to the process of displaying character information corresponding to the new depression of the operation section, displaying the character information is delayed. The third embodiment can overcome even such a problem.

Figure 10:
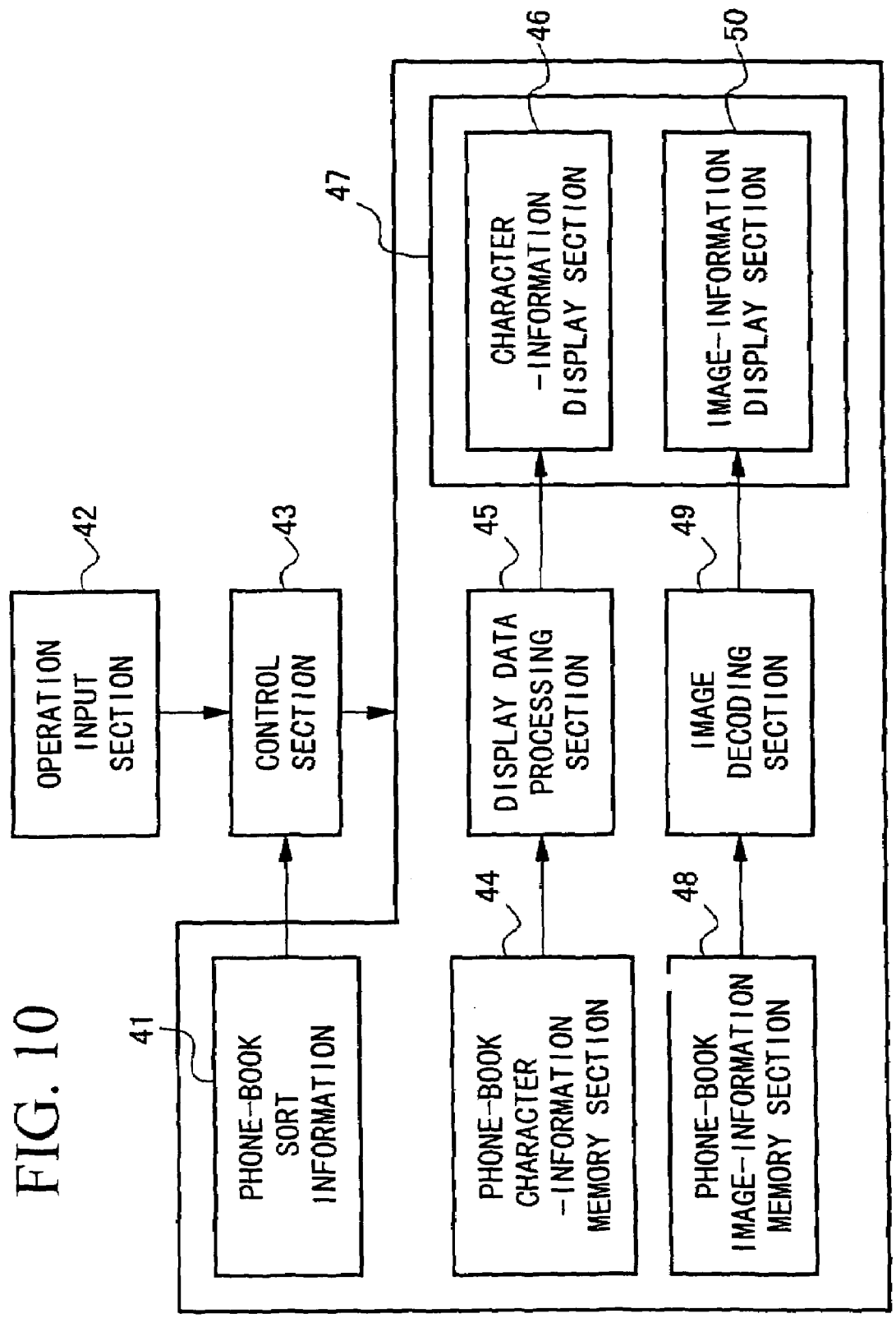
FIG. 10 is a block diagram illustrating a portable telephone according to a third embodiment of this invention.

FIG. 10 is a block diagram illustrating the process of the phone-book capability of a portable telephone according to the third embodiment of this invention. This telephone comprises a phone-book sort information section 41, an operation input section 42, a control section 43, a phone-book character-information memory 44, a display data processing section 45, a display section 47, a phone-book image-information memory section 48, and an image decoding section 49. The display section 47 has a character-information display section 46 and an image-information display section 50.

In response to a search request from the operation input section 42, the control section 43 searches registered data based on information in the phone-book sort information section 41. When a search request from the operation input section 42 is a key-depression signal, a long-depression signal or a repeat signal, the control section 43 reads information which can be displayed immediately, such as character information, from the phone-book character-information memory 44, processes the character information in the display data processing section 45, and displays the processed information on the character-information display section 46 of the display section 47. When a search request from the operation input section 42 is a release signal, the control section 43 starts the delay timer to delay the initiation of image decoding, reads image information from the phone-book image-information memory section 48 when the time set in the delay timer elapses, causes the image decoding section 49 to decode the image information, and displays the resultant information on the image-information display section 50.

Figure 11:
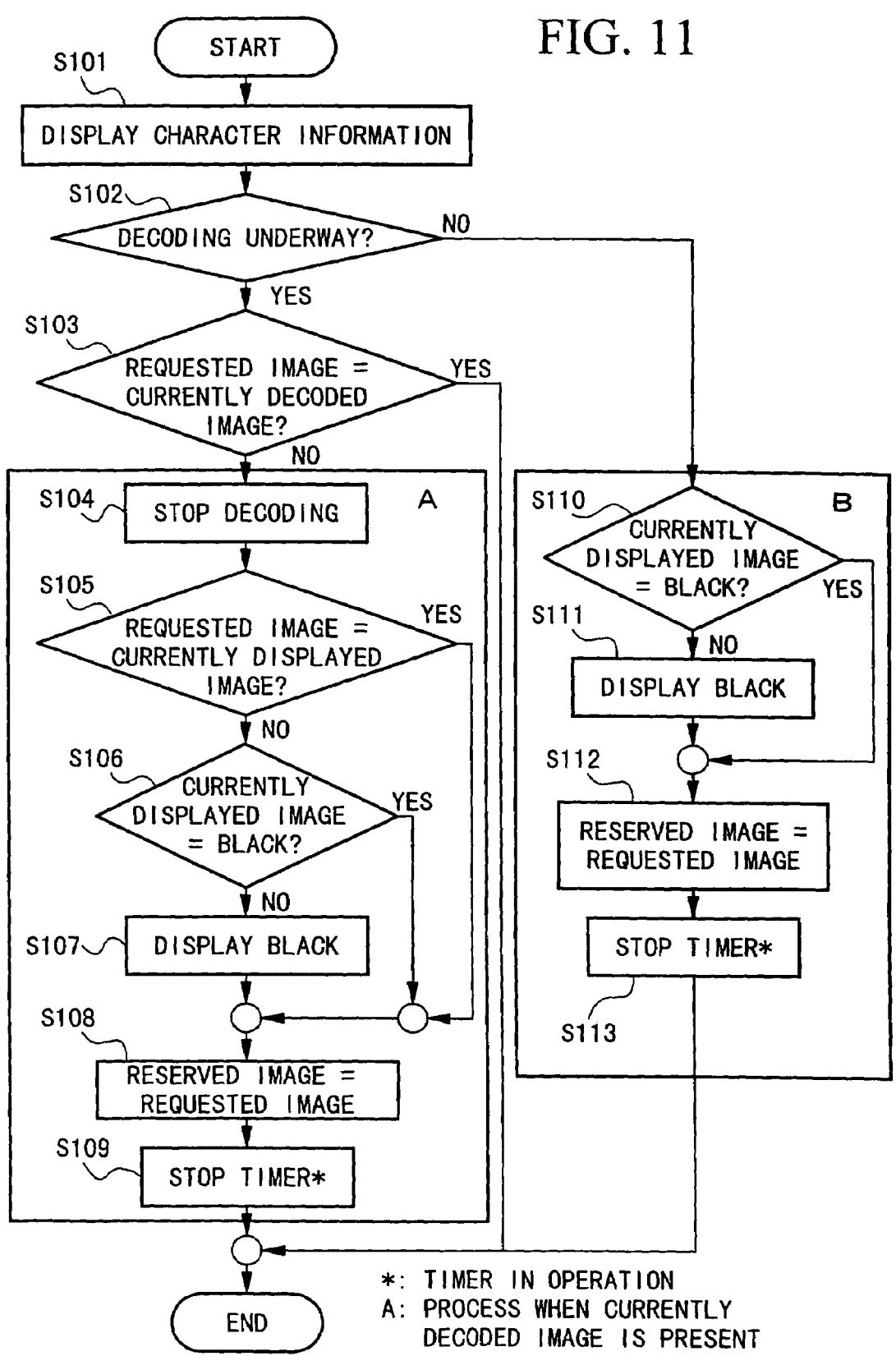
FIG. 11 is a flowchart illustrating the process of a phone-book capability when a search is initiated.

FIG. 11 is a flowchart illustrating the process of the phone-book capability at the beginning of a search according to this embodiment.

When a user makes an input for a search operation (key depression, long depression, or repeat), character information of the result of the requested search is displayed (S101). At this time, when decoding of image information is in progress (S102) and when the display-requested image retrieved (requested image) does not match with the currently-decoded image (S103), the image decoding is stopped (S104). When the image that is being displayed then differs from the requested image, the display is temporarily made black (S105 to S1107). Then, the requested image is registered as a reserved image (an image to be decoded and displayed next) (S108). When the timer for delaying the beginning of image decoding is in operation at that time, the timer is stopped (S109).

When no image decoding is taking place in step S102 and the currently-displayed image differs from the requested image, the display is temporarily made black and the requested image is registered as a reserved image (S110 to S112). When the timer for delaying the beginning of image decoding is in operation at that time, the timer is stopped (S113).

Figure 12:
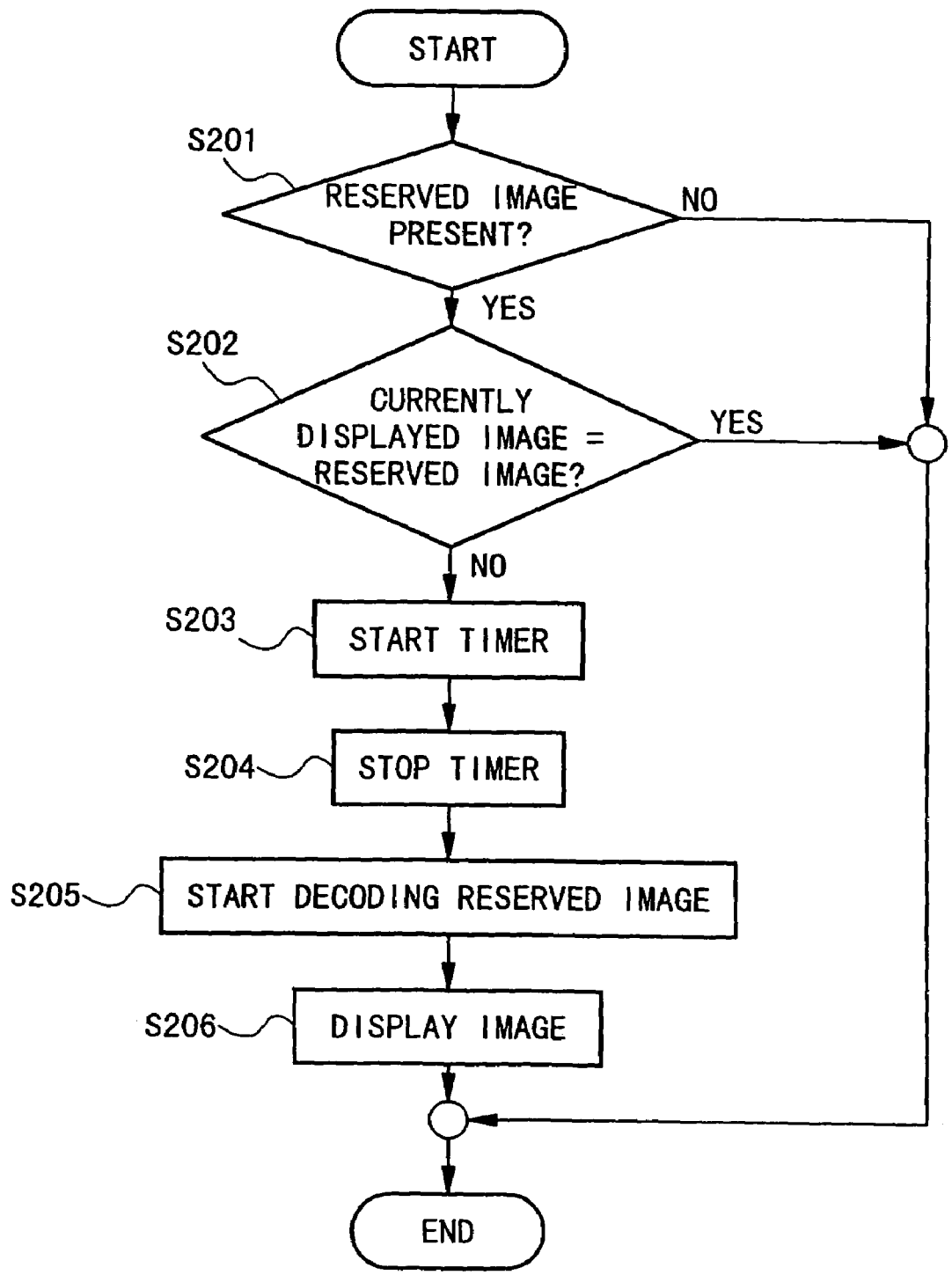
FIG. 12 is a flowchart illustrating the process of the phone-book capability when the search is ended.

FIG. 12 is a flowchart illustrating the process of the phone-book capability of a portable video telephone according to the third embodiment at the time a search is ended. When the control section 43 detects a release signal indicating a user's operation for stopping a continuous search (e.g., release of the depressed operation button or lever), the control section 43 first determines if there is a reserved image to be decoded (S201). In this step, the control section 43 checks whether or not image information corresponding to the search result is registered as a reserved image. When there is a reserved image, the control section 43 determines if this reserved image coincides with the currently-displayed image (S202), and starts the delay timer to delay the beginning of decoding of the reserved image (S203). When the time set in the timer elapses without any interruption signal generated from the operation section (S204), decoding the reserved image starts (S205) and image information is displayed after decoding is completed.

Figure 13:
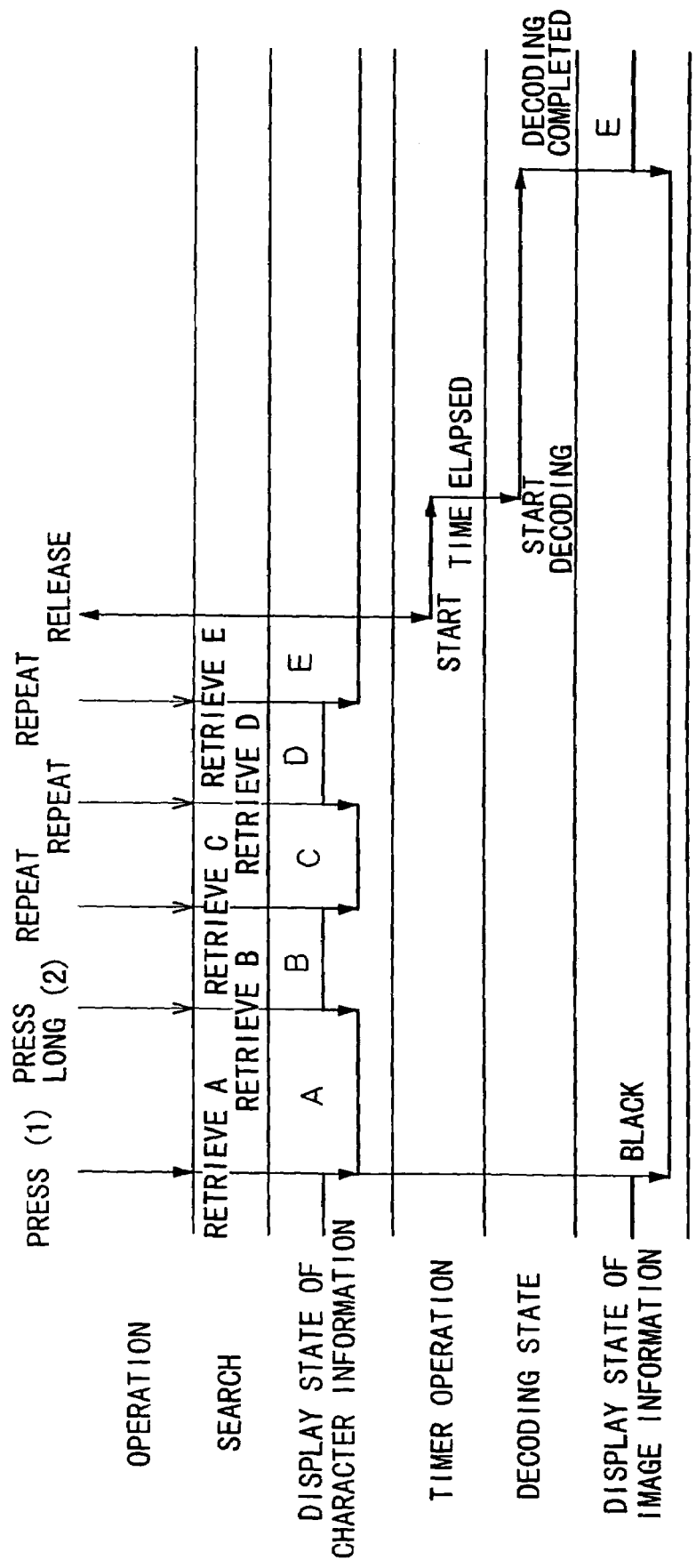
FIG. 13 is a timing chart for explaining the operation of this portable telephone while searching a phone book.

FIG. 13 is a timing chart for explaining the operation of this portable video telephone of the third embodiment at the time of searching the phone book. The diagram shows, from the top, the timing at which a search-operation signal is input, the search result, the display state of character information, the point of activation, the in-operation state and the stopped state of the timer, the beginning, the in-progress state and the stopped/finished state of image decoding, and the display state of image information. The upward and downward arrows in FIG. 13 indicate mutually linked processes. The capital letters identify the registered data of the search result and the same capital letter indicates the same registered data.

When the user starts searching the phone book, first, the character information of a search result A associated with the first operation (depression (1)) is displayed and a black image is displayed. When the user keeps depressing the operation section to perform a continuous search, the CPU determines that it is a long depression (2). Thereafter, while the operation section is kept depressed, a repeat signal is output at a given interval. With regard to the search result originating from the long depression (2) and the repeat signal, character information alone is updated and displayed. When the user thereafter releases the depressed operation section to stop the continuous search, a release signal is output to activate the timer that determines the beginning of image decoding. When the time set in the timer elapses, the image decoding and displaying processes are started and an image is displayed after decoding is completed.

As apparent from the above, the third embodiment can assure a smooth operability by eliminating a burden in image decoding during a scroll-involved search.

Fourth Embodiment

Figure 15:
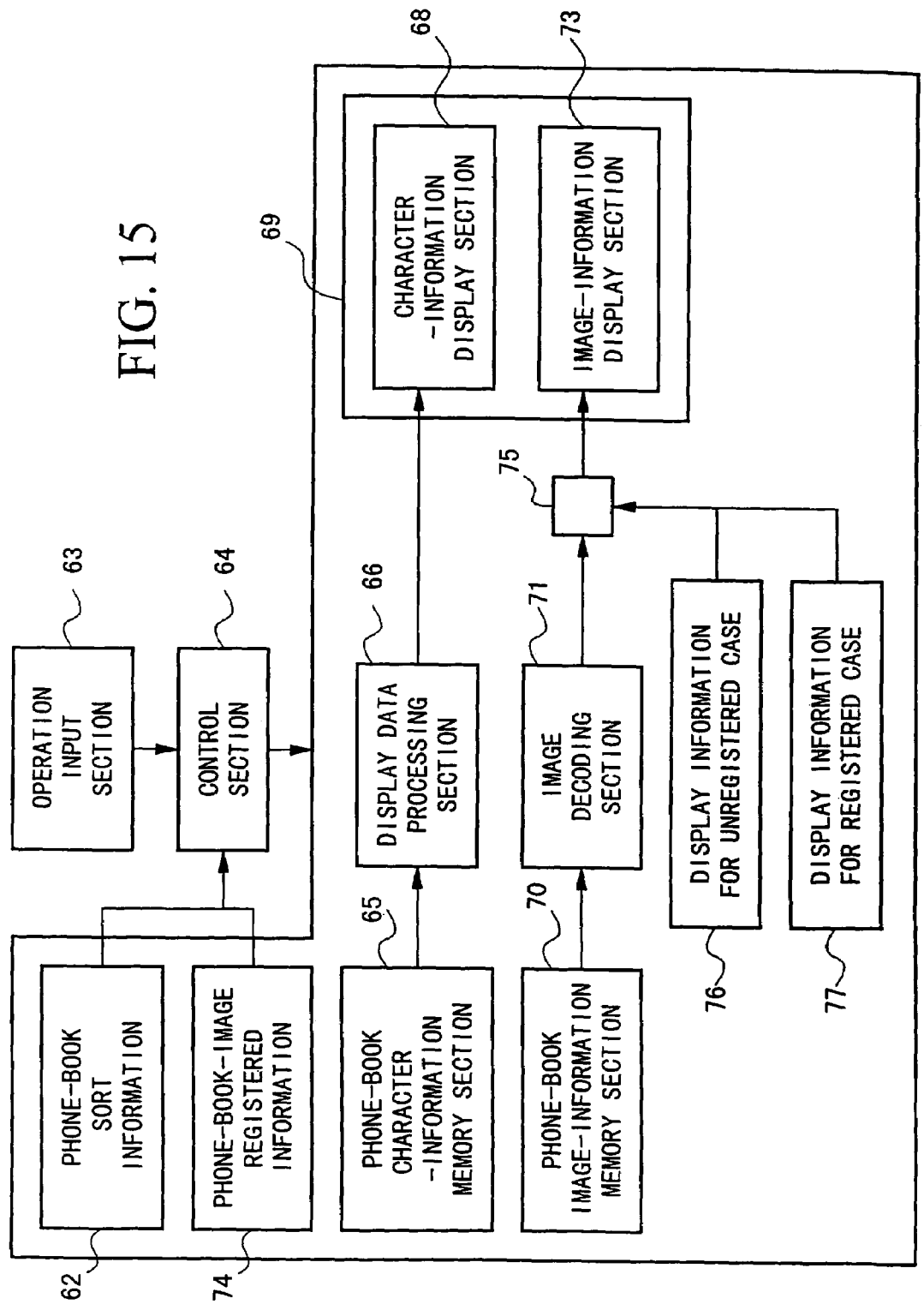
FIG. 15 is a block diagram showing a portable telephone according to a fourth embodiment of this invention.

The fourth embodiment of this invention will now be discussed. FIG. 15 is a block diagram showing the process of a phone-book capability according to the fourth embodiment. In response to a search request from an operation input section 63, a control section 64 searches registered data based on phone-book sort information 62. Then, by referring to phone-book-image registered information 74, the control section 64 determines whether or not an image is registered in the registered data of the search result. Based on the search result and the result of this decision on a registered image, the control section 64 reads information corresponding to the search result from a phone-book character-information memory section 65 and/or a phone-book image-information memory section 70 and displays the resultant information on a display section 69.

The character information read from the phone-book character-information memory section 65 is processed to have a predetermined display format in a display data processing section 66. The processed information is then displayed on a character-information display section 68. The image information read from the phone-book image-information memory section 70 is decoded by an image decoding section 71 and is then displayed on an image-information display section 73. At this time, when it is decided in the aforementioned decision that no image is registered, a selecting section 75 changes the display of the display section 69 as defined in display information 76 for a registered case. When an image is registered, on the other hand, the selecting section 75 changes the display of the display section 69 as defined in display information 77 for an unregistered case (see FIGS. 18 and 19). It is assumed that the display information 76 and the display information 77 define different information.

Figure 16:
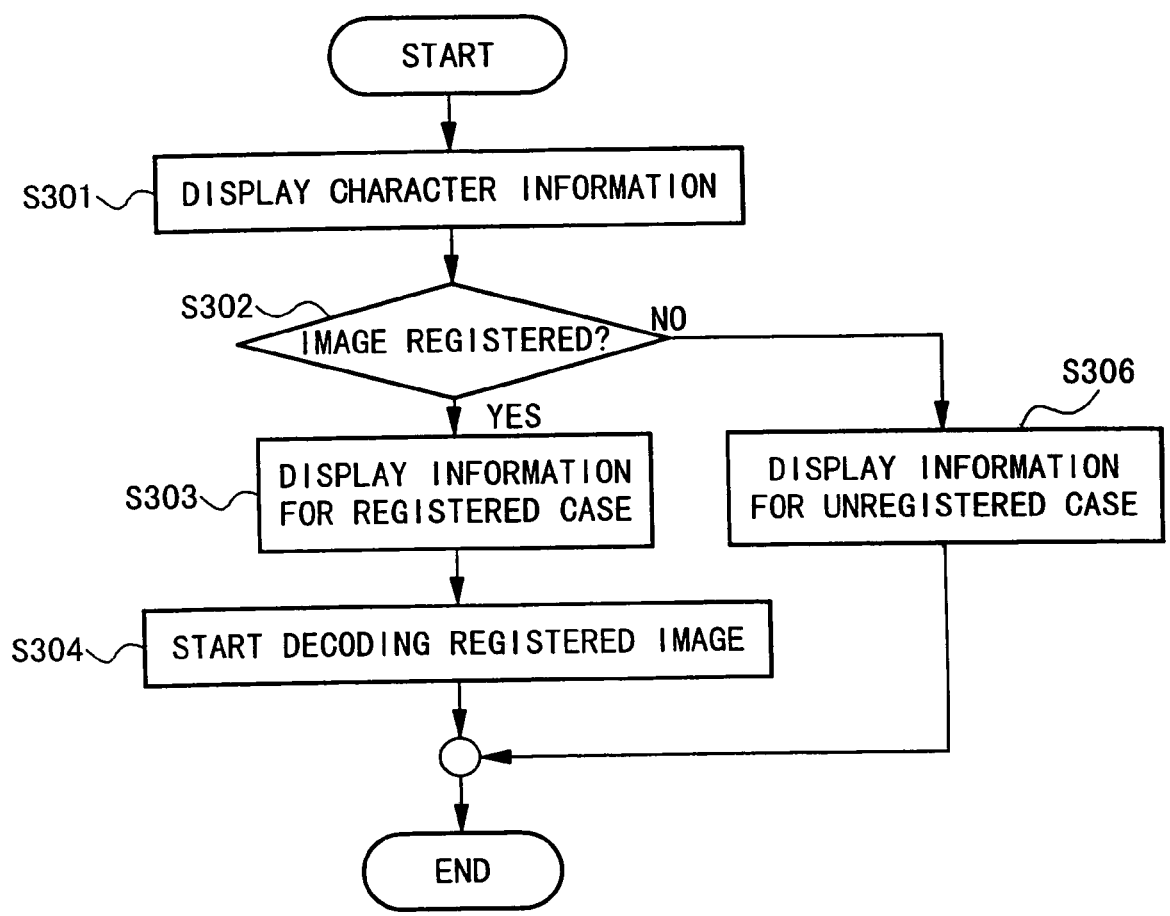
FIG. 16 is a flowchart illustrating the process of a phone-book capability.

FIG. 16 shows a flowchart for the process of the phone-book capability according to the fourth embodiment. When a search result originating from the input for a search operation which has been made by a user is obtained, character information is displayed first (S301). Next, it is determined whether or not an image is registered in the registered data or the search result (S302). When no image is registered, an image for an unregistered case is displayed (S306), after which the process is terminated. When an image is registered, on the other hand, an image for a registered case is displayed (S303), and the process of displaying (decoding) the registered image is started (S304). When the displaying process (the decoding process) for the registered image is completed, the image for a registered case is switched to the registered image.

Figure 17:
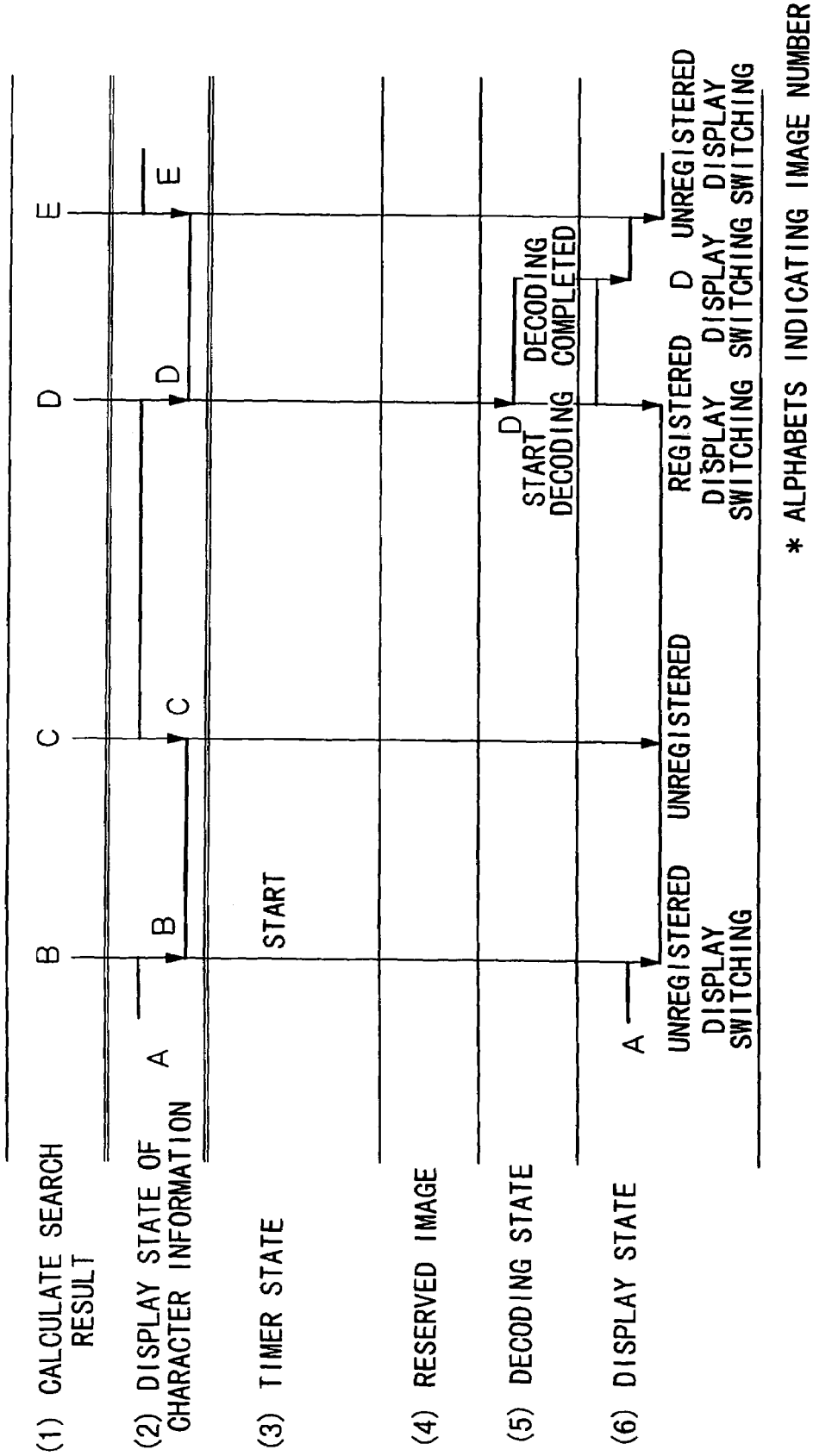
FIG. 17 is a timing chart illustrating the operation of this portable telephone while searching a phone book.

FIG. 17 is a timing chart for explaining the operation of the fourth embodiment at the time of searching the phone book. The diagram shows, from the top, (1) the timing at which a search result is selected according to a search operation, (2) the display state of character information, (3) the point of activation, the in-operation state, and the stopped state of the timer, (4) the registered state of an image which is to be subjected to the displaying process (decoding process) when the time set in the timer elapses, (5) the beginning, the in-progress state, the stopped state, and the finished state of image decoding, and (6) the display state of image information. The downward arrows in this diagram indicate mutually linked processes. Of the left-to-right lines, each thick line indicates a process in progress. The capital letters identify the registered data of the search result and the same capital letter indicates the same registered data. Note that no image is registered in registered data B, C and E while an image is registered in registered data A and D.

The display of characters is updated for each search. With regard to the display of an image, when no image is registered in the registered data (registered data B, C, or E), an image for an unregistered case is displayed. When an image is registered in registered data (registered data A or D), an image for a registered case is displayed and the process of displaying (decoding) the registered image is initiated.

Figure 18:
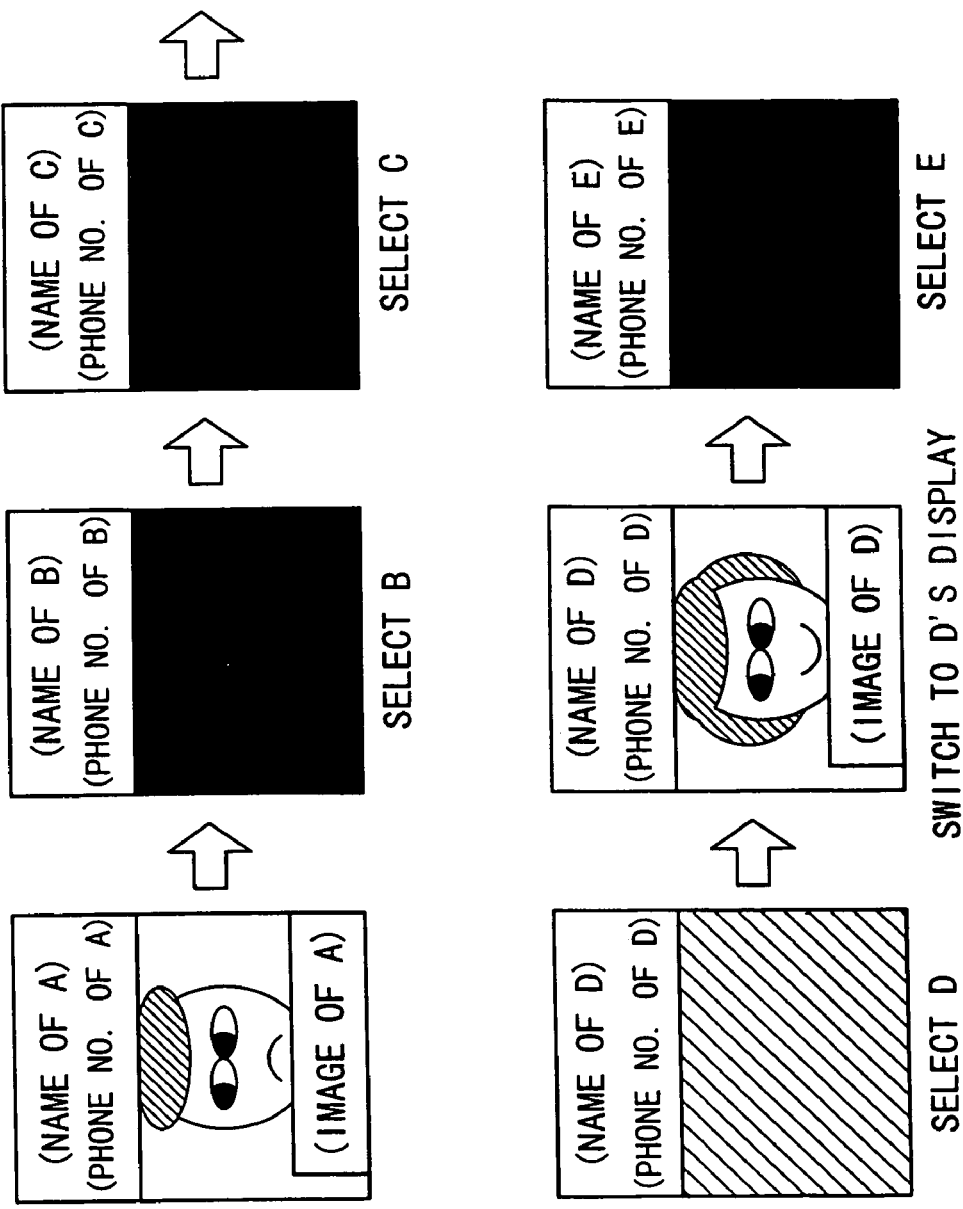

FIG. 18 exemplifies the display of the phone book of a portable video telephone according to the fourth embodiment. In this example, when data which has no image registered is selected (when B, C or E is selected), the image display screen is made black. When data which has an image registered is selected (when D is selected), the image display screen is made gray. When image decoding is completed so that the registered image becomes displayable, the gray screen is erased and the registered image is displayed.

FIG. 19 exemplifies the display of the phone book according to a modification of the fourth embodiment, which results from the operation illustrated in FIG. 17. In this example, when displaying character information in registered data which has an image registered therein, a mark (character information or image information) indicating the presence of an image is displayed on the screen. This can allow a user to grasp whether or not an image is registered in the registered data, at the time the character information of the search result is displayed.

According to the fourth embodiment, at the time of displaying image-unregistered data, the image display screen is made black, but this method is not restrictive and any other method may be used instead as long as it indicates that no image is registered. For instance, when no image is registered, the luminance level of the backlight of a liquid crystal display device may be changed to make the display brighter or darker.

Although only four embodiments of this invention have been described herein, it should be apparent to those skilled in the art that those embodiments are in no way restrictive and this invention may be embodied in many other specific forms without departing from the spirit or scope of the invention. For example, the structures of the four embodiments may be combined as needed or a well-known structure may be added to those structures.

What is claimed is:

1. A wireless communication device comprising:
  a control section configured for retrieving character information associated with decoding-intensive information from a data repository structure and displaying the character information and the associated decoding-intensive information only in accordance with key operation, said control section further comprising:
  a means for making the delay time up to a beginning of image decoding longer in proportion to a click interval in a fast and continuous search, and a means for making the delay time up to the beginning of image decoding shorter than the search interval in a slow search;
  a means for updating said character information alone with regards to long depression and means for outputting a release signal to activate a timer that determines beginning of image decoding; and
  a means for determining whether an image is registered in a registered data of a search result referring to phone-book-image registered information and a means for reading information corresponding to a decision result from a phone-book-image information memory section;
  a character display section wherein the character information only is displayed during said continuous search operation based on the key operation, and
  a decoding-intensive display section that is associated with the decoding-intensive information corresponding to a currently-displayed character, wherein the decoding-intensive information is decoded and displayed only after a predetermined time interval from the a key input elapses without another key input.

2. A wireless communication device as claimed in claim 1, wherein the decoding-intensive information comprises a static image data file according to a registered display information or an unregistered display information.

3. A wireless communication device as claimed in claim 1, wherein the decoding-intensive information comprises a motion video data file.

4. A wireless communication device as claimed in claim 1, wherein the decoding-intensive information comprises an audio file.

5. A wireless communication device as claimed in claim 1, wherein the data repository structure is a phone book.

6. A wireless communication device as claimed in claim 1, wherein the data repository structure is a messaging in-box.

7. A wireless communication device as claimed in claim 1, wherein the continuous search operation is activated by continuous depression of a key and a display mode is switched to a scrolling display mode.

8. A wireless communication device as claimed in claim 1, wherein the continuous search operation is activated by repetitive depression of a key.

9. A method for searching character information and decoding-intensive information stored in a data repository structure of a portable telephone comprising:
   receiving input commands for searching the data repository structure;
   displaying character information in response to the input commands on a screen;
   measuring time intervals between the input commands;
   decoding the decoding-intensive information in accordance with the measured time intervals;
   displaying the decoding-intensive information that is associated with the character information after the measured time interval on the screen;
   making the delay time up to a beginning of image decoding longer in proportion to a click interval in a fast and continuous search, and making the delay time up to the beginning of image decoding shorter than the search interval in a slow search;
   updating said character information alone with regards to Long depression and outputting a release signal to activate a timer that determines beginning of image decoding; and
   determining whether an image is registered in a registered data of a search result referring to phone-hook-image registered information and reading information corresponding to a decision result from a phone-book-image information memory section.

10. A method as claimed in claim 9, wherein the decoding-intensive information comprises a static image file according to a registered display information or an unregistered display information.

11. A method as claimed in claim 9, wherein the decoding-intensive information comprises a motion video file.

12. A method as claimed in claim 9, wherein the decoding-intensive information comprises an audio file.

13. A method as claimed in claim 9, wherein the data repository structure is a phone book.

14. A method as claimed in claim 9, wherein the data repository structure is a messaging in-box.

15. A computer-readable storage medium encoded with a computer program, containing a set of instructions to perform a method for searching character information and decoding-intensive information stored in a data repository structure of a portable telephone, the method including:
   receiving input commands for searching the data repository structure;
   displaying character information in response to the input commands on a screen;
   measuring time intervals between the input commands;
   decoding the decoding-intensive information in accordance with the measured time intervals;
   displaying the decoding-intensive information that is associated with the character information after the measured time interval on the screen;
   making the delay time up to a beginning of image decoding longer in proportion to a click interval in a fast and continuous search, and making the delay time up to the beginning of image decoding shorter than the search interval in a slow search;
   updating said character information alone with regards to long depression and outputting a release signal to activate a timer that determines beginning of image decoding; and
   determining whether an image is registered in a registered data of a search result referring to phone-book-image registered information and reading information corresponding to a decision result from a phone-book-image information memory section.

16. A computer-readable storage medium as claimed in claim 15, wherein the decoding-intensive information comprises a static image data file according to a registered display information or an unregistered display information.

17. A computer-readable storage medium as claimed in claim 15, wherein the decoding-intensive information comprises a motion video data file.

18. A computer-readable storage medium as claimed in claim 15, wherein the decoding-intensive information comprises an audio file.

19. A computer-readable storage medium as claimed in claim 15, wherein the data repository structure is a phone book.

20. A computer-readable storage medium as claimed in claim 15, wherein the data repository structure is a messaging in-box.

21. A wireless communication device as claimed in claim 1, wherein the key input comprises another key depression or a continuously depressed key, which makes a display mode switch to a scrolling display mode.

22. A method as claimed in claim 9, wherein the decoding-intensive information is decoded only if the measured time interval exceeds a predetermined time interval.

23. A computer-readable storage medium as claimed in claim 15, wherein the decoding-intensive information is decoded only if the measured time interval exceeds a predetermined time interval.

* * * * *